US012664790B2

(12) United States Patent
Kabkab et al.

(10) Patent No.: US 12,664,790 B2
(45) Date of Patent: Jun. 23, 2026

(54) JOINT DETECTION AND GROUPING OF ROAD OBJECTS USING MACHINE LEARNING

(71) Applicant: Waymo LLC, Mountain View, CA (US)

(72) Inventors: Maya Kabkab, Palo Alto, CA (US);
Yu-Han Chen, Santa Clara, CA (US);
Zhibo Yang, Stony Brook, NY (US);
Xia Chen, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 1037 days.

(21) Appl. No.: 17/808,244

(22) Filed: Jun. 22, 2022

(65) Prior Publication Data

US 2023/0419678 A1     Dec. 28, 2023

(51) Int. Cl.
*G06V 20/58*        (2022.01)
*G06V 10/774*       (2022.01)
(Continued)

(52) U.S. Cl.
CPC ............ *G06V 20/58* (2022.01); *G06V 10/774* (2022.01); *G06V 10/82* (2022.01); *G06V 20/70* (2022.01)

(58) Field of Classification Search
None
See application file for complete search history.

(56) References Cited

U.S. PATENT DOCUMENTS

2014/0063232 A1* 3/2014 Fairfield ............... G06V 20/58
                                                  382/104
2016/0046290 A1    2/2016 Aharony et al.
                          (Continued)

FOREIGN PATENT DOCUMENTS

CN      109426776 A      3/2019
CN      113269040 B      7/2024

OTHER PUBLICATIONS

European Patent Office, Extended European Search Report issued on Sep. 26, 2023, issued in connection with European Patent Application No. 23165509.3, 8 pages.
(Continued)

*Primary Examiner* — Chan S Park
(74) *Attorney, Agent, or Firm* — McDonnell Boehnen Hulbert & Berghoff LLP

(57)                    ABSTRACT

A method includes obtaining an image representing road objects belonging to a particular class, and generating, based on the image, feature maps that represent visual features of the image. The method also includes determining, based on the feature maps and for each respective road object of the plurality of road objects, a corresponding location at which the respective road object has been detected within the image and a corresponding tag value associated with the respective road object. The method additionally includes determining groups of the road objects based on the tag value of each respective road object, and identifying, for each respective group, a corresponding road condition based on the corresponding locations of the road objects in the respective group and the particular class. The method further includes generating an output that represents the corresponding road condition of each respective group.

20 Claims, 19 Drawing Sheets

(51) Int. Cl.
  G06V 10/82     (2022.01)
  G06V 20/70     (2022.01)

(56)             References Cited

U.S. PATENT DOCUMENTS

2020/0004256 A1*   1/2020   Russell ................. B60W 40/04
2020/0365016 A1*  11/2020   Silver .................. G06V 20/588
2022/0026917 A1*   1/2022   Beijbom .............. G05D 1/0251

OTHER PUBLICATIONS

Duan et al., "CenterNet: Keypoint Triplets for Object Detection," arXiv:1904.08189v3, Apr. 19, 2019, 10 pages.
Fabbri et al., "Learning to Detect and Track Visible and Occluded Body Joints in a Virtual World," ECCV 2018, 17 pages.
Kipf et al., "Semi-Supervised Classification with Graph Convolutional Networks," Conference paper at ICLR, 2017, arXiv:1609.02907v4, Feb. 22, 2017, 14 pages.
Lin et al., "Deep Hough-Transform Line Priors," arXiv:2007.09493v1, Jul. 18, 2020, 22 pages.
Newell et al., "Associative Embedding: End-toEnd Learning for Joint Detection and Grouping," arXiv:1611.05434v2, Jun. 9, 2017, 11 pages.
Newell et al., "Pixels to Graphs by Associative Embedding," arXiv:1706.07365v2, Mar. 27, 2018, 10 pages.
Qi et al., "Attentive Relational Networks for Mapping Images to Scene Graphs," Computer Vision and Pattern Recognition, IEEE, 2018, pp. 3957-3966.
Vaswani et al., "Attention is All You Need," 31st Conference on Neural Information Processing Systems, arXiv:1706.03762v5, Dec. 6, 2017, 15 pages.
Zhou et al., "Objects as Points," arXiv:1904.07850v2, Apr. 25, 2019, 12 pages.

* cited by examiner

260

210

208

204A

204B

202

206

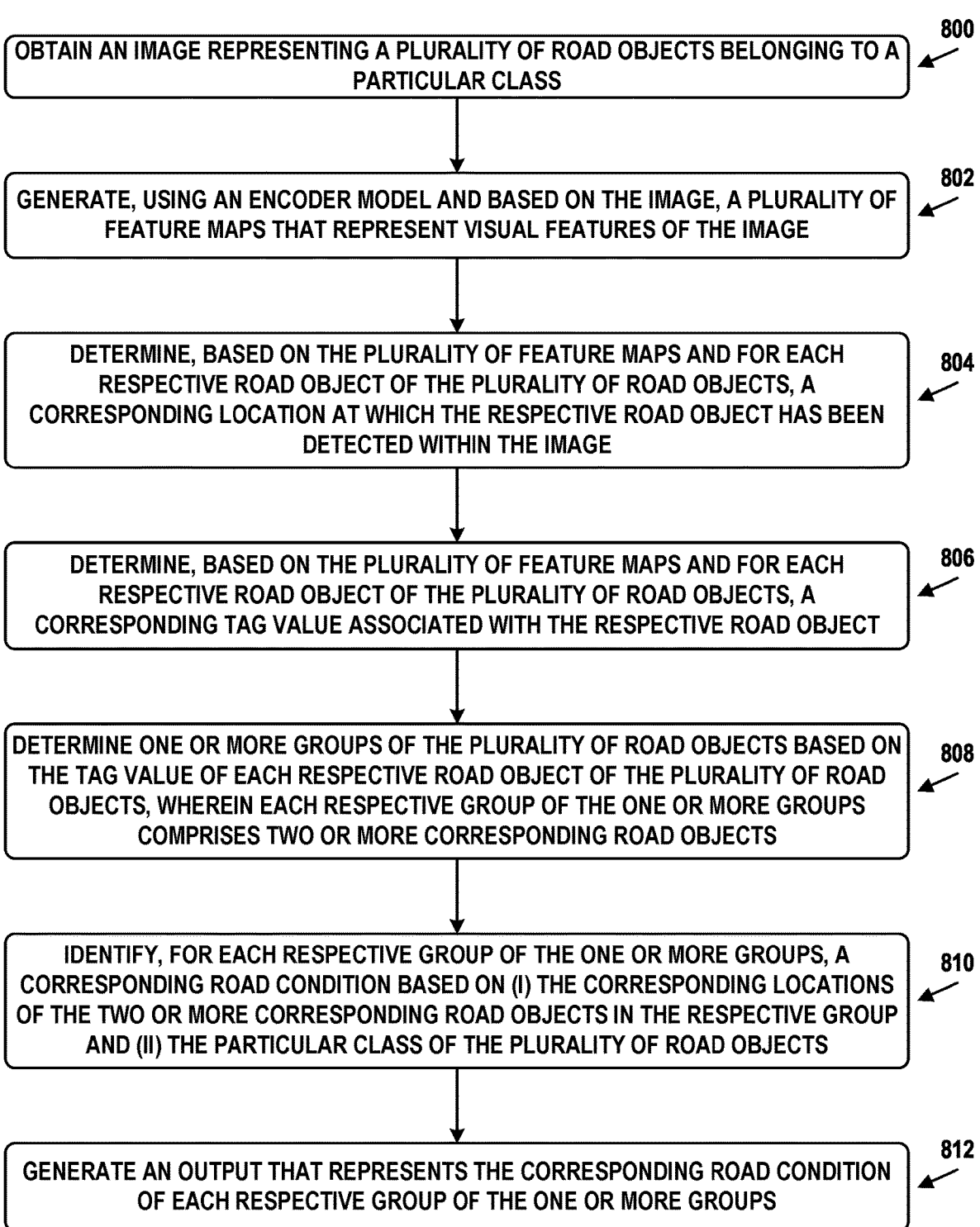

OBTAIN AN IMAGE REPRESENTING A PLURALITY OF ROAD OBJECTS BELONGING TO A PARTICULAR CLASS    800

GENERATE, USING AN ENCODER MODEL AND BASED ON THE IMAGE, A PLURALITY OF FEATURE MAPS THAT REPRESENT VISUAL FEATURES OF THE IMAGE    802

DETERMINE, BASED ON THE PLURALITY OF FEATURE MAPS AND FOR EACH RESPECTIVE ROAD OBJECT OF THE PLURALITY OF ROAD OBJECTS, A CORRESPONDING LOCATION AT WHICH THE RESPECTIVE ROAD OBJECT HAS BEEN DETECTED WITHIN THE IMAGE    804

DETERMINE, BASED ON THE PLURALITY OF FEATURE MAPS AND FOR EACH RESPECTIVE ROAD OBJECT OF THE PLURALITY OF ROAD OBJECTS, A CORRESPONDING TAG VALUE ASSOCIATED WITH THE RESPECTIVE ROAD OBJECT    806

DETERMINE ONE OR MORE GROUPS OF THE PLURALITY OF ROAD OBJECTS BASED ON THE TAG VALUE OF EACH RESPECTIVE ROAD OBJECT OF THE PLURALITY OF ROAD OBJECTS, WHEREIN EACH RESPECTIVE GROUP OF THE ONE OR MORE GROUPS COMPRISES TWO OR MORE CORRESPONDING ROAD OBJECTS    808

IDENTIFY, FOR EACH RESPECTIVE GROUP OF THE ONE OR MORE GROUPS, A CORRESPONDING ROAD CONDITION BASED ON (I) THE CORRESPONDING LOCATIONS OF THE TWO OR MORE CORRESPONDING ROAD OBJECTS IN THE RESPECTIVE GROUP AND (II) THE PARTICULAR CLASS OF THE PLURALITY OF ROAD OBJECTS    810

GENERATE AN OUTPUT THAT REPRESENTS THE CORRESPONDING ROAD CONDITION OF EACH RESPECTIVE GROUP OF THE ONE OR MORE GROUPS    812

Figure 8

JOINT DETECTION AND GROUPING OF ROAD OBJECTS USING MACHINE LEARNING

BACKGROUND

Machine learning models may be used to process various types of data, including images, to generate various desirable outputs. Improvements in the machine learning models allow the models to carry out the processing of data faster, to utilize fewer computing resources for the processing, and/or to generate outputs that are of relatively higher quality.

SUMMARY

A machine learning (ML) based system may be configured to detect and group road objects. The system may be configured to generate, based on an image of an environment that includes road objects, feature maps representing the visual content of the environment. The feature maps may be used to determine a keypoint map that indicates locations of the road objects, and a tag map that indicates groupings of the road objects. Based on the locations of the road objects, the groupings of the road objects, and a class to which the road objects belong, the system may be configured to identify one or more road conditions associated with the groupings of road objects. A vehicle or other device may be configured to operate in the road environment based on the one or more road conditions.

In a first example embodiment, a method may include obtaining an image representing a plurality of road objects belonging to a particular class, and generating, using an encoder model and based on the image, a plurality of feature maps that represent visual features of the image. The method may also include determining, based on the plurality of feature maps and for each respective road object of the plurality of road objects, a corresponding location at which the respective road object has been detected within the image. The method may additionally include determining, based on the plurality of feature maps and for each respective road object of the plurality of road objects, a corresponding tag value associated with the respective road object, and determining one or more groups of the plurality of road objects based on the tag value of each respective road object of the plurality of road objects. Each respective group of the one or more groups may include two or more corresponding road objects. The method may further include identifying, for each respective group of the one or more groups, a corresponding road condition based on (i) the corresponding locations of the two or more corresponding road objects in the respective group and (ii) the particular class of the plurality of road objects. The method may yet further include generating an output that represents the corresponding road condition of each respective group of the one or more groups.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a flow chart, in accordance with examples described herein.

DETAILED DESCRIPTION

Figure 1:
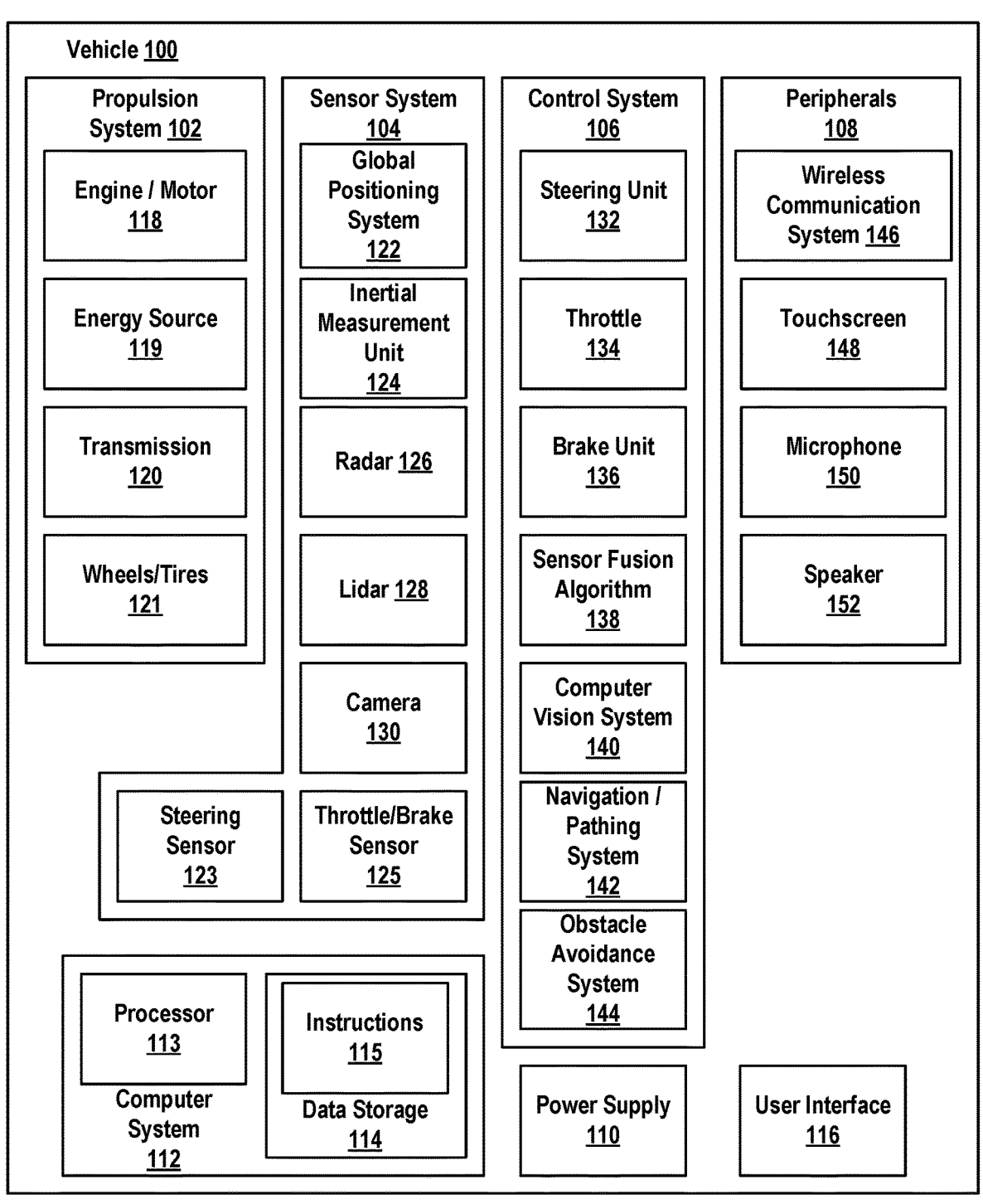
FIG. 1 is a functional block diagram illustrating a vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A machine learning (ML) based system may be configured to identify and group road objects in an environment. The road objects may be represented within an image of the environment. The image may be processed by, for example, an encoding model to generate feature maps that represent the visual content of the image. The feature maps may be used to generate (i) a keypoint map that indicates locations within the image at which road objects are detected, (ii) an offset map that corrects for resolution loss in the keypoint map due to down sampling, and (iii) one or more tag maps that indicate groupings of the road objects detected within the keypoint map. Thus, the keypoint map may be used to detect road objects, the offset map may be used to determine (e.g., refine) the locations of the detected road objects within the image, and the tag map(s) may be used to identify groups of the detected road objects.

In some implementations, each of the keypoint map, the offset map, and the tag map may be determined jointly, concurrently, and/or in parallel. That is, determination of the keypoint map might not depend on the offset map and/or the tag map as inputs, determination of the offset map might not depend on the keypoint map and/or the tag map as inputs, and determination of the tag map might not depend on the keypoint map and/or the offset map as inputs. While determinations of the keypoint map, the offset map, and/or the tag map may be independent of one another (and may thus be carried out concurrently and/or in parallel), information from these maps may be combined to determine the locations and groupings of the road objects.

The system may be configured to determine the groups of the detected objects by grouping together road objects that (i) belong to a particular class and (ii) are associated with similar tag values in the tag map. In some implementations, the system may be configured to handle different classes of road objects by generating class-specific instances of the keypoint map, offset map, and/or the tag map. These class-specific instances of the keypoint map, offset map, and/or the tag map may be generated using class-specific ML models, or ML models that have been trained to operate with respect to a plurality of different objects classes.

A grouping of two or more road objects may be used to determine a road condition associated with the grouping. Specifically, the class of the two or more objects, the respective positions of the two or more objects, and the membership of the two or more objects in the same group may indicate and/or signal the road condition. For example, two or more traffic cones may delineate a region of the environment as a construction zone or an accident zone, and may thus indicate that the region of the environment is not traversable by a vehicle.

Joint, concurrent, and/or parallel detection and grouping of road objects based on image data may be particularly desirable in cases where early detection of a road condition is important. For example, early detection of road conditions may be important for vehicles with low deceleration capabilities (e.g., semi-trucks, large passenger vehicles, etc.), vehicles with low maneuverability, and/or vehicles traveling at a high speed, among other possibilities.

The detection and grouping systems and/or operations discussed herein may be executed faster, with fewer computing resources, and/or more accurately than serial approaches where objects grouping is carried out based on (and thus after) object detection, and/or possibly using a more complex (e.g., three-dimensional) representation of the environment. Such serial approaches may take more time to complete because performance of object grouping depends on completion of object detection. Further, such serial approaches may be less accurate because any object detection errors may be propagated through to object grouping, since object grouping receives as input the output of object detection.

II. Example Vehicle Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., O2 monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
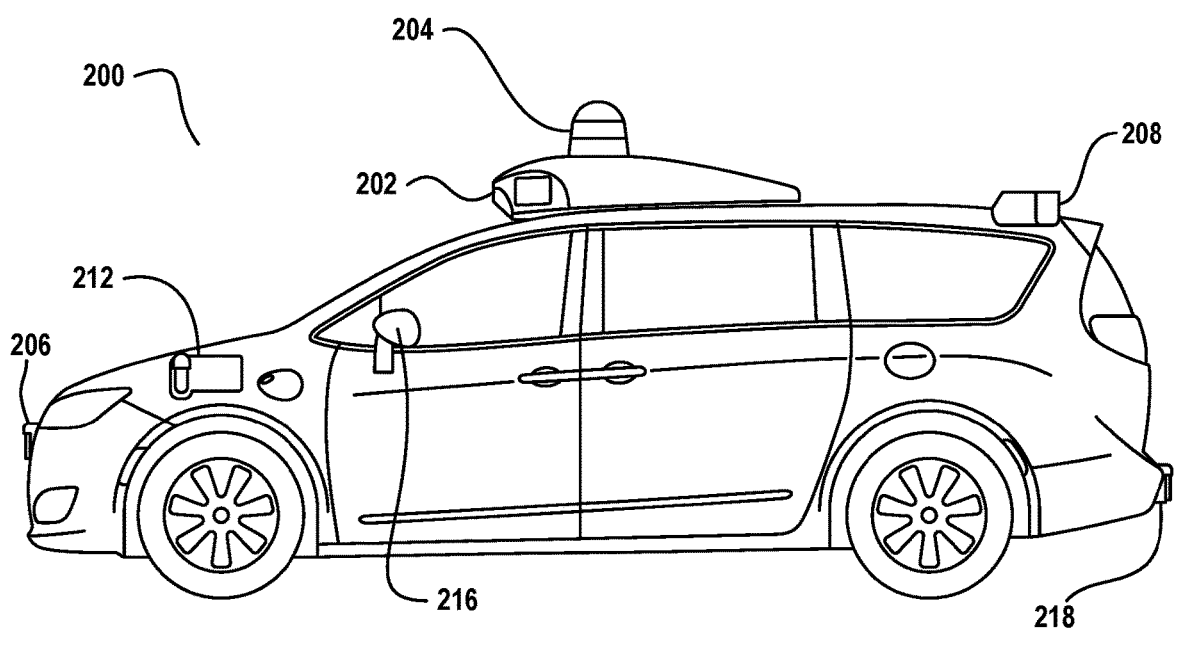
FIG. 2A, 2B, 2C, 2D, and 2E contain illustrations of a physical configuration of a vehicle, in accordance with examples described herein.
Figure 2B:
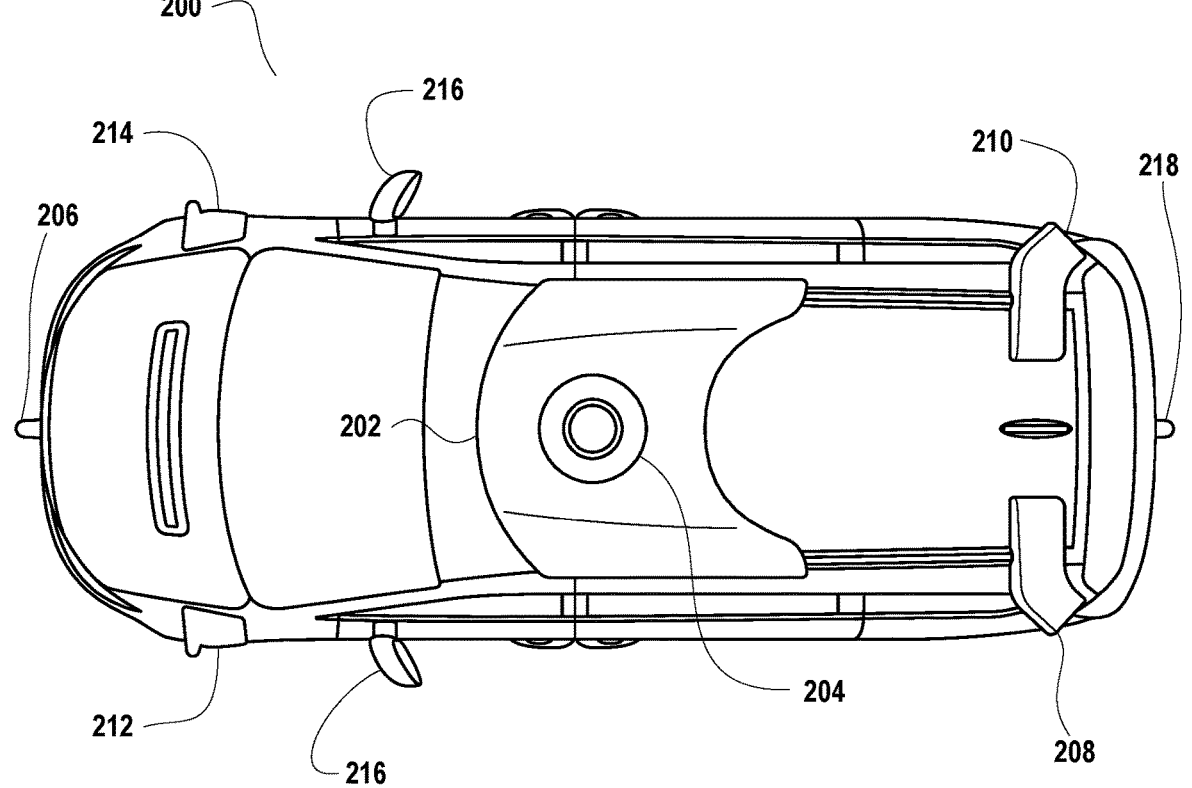
Figure 2C:
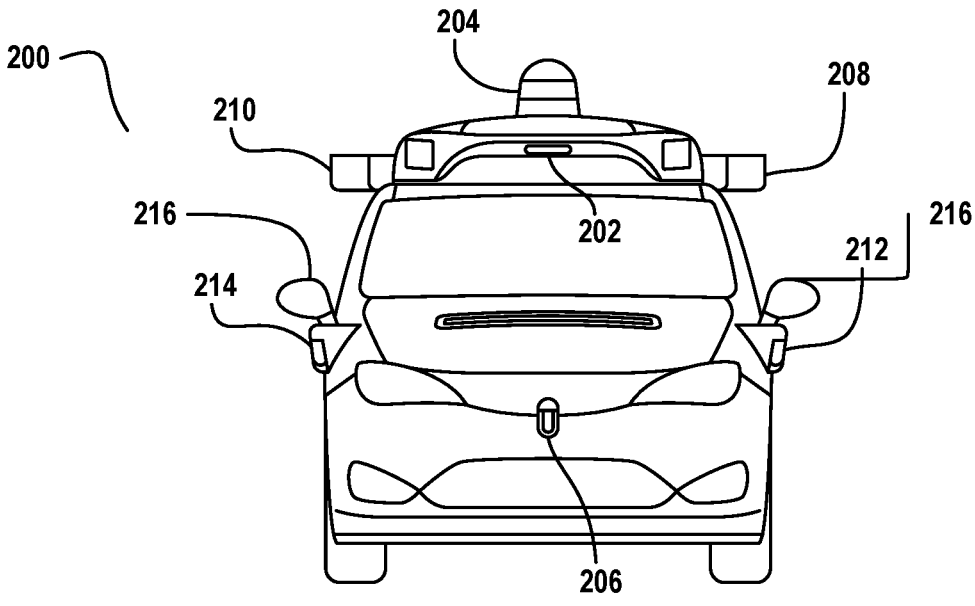
Figure 2D:
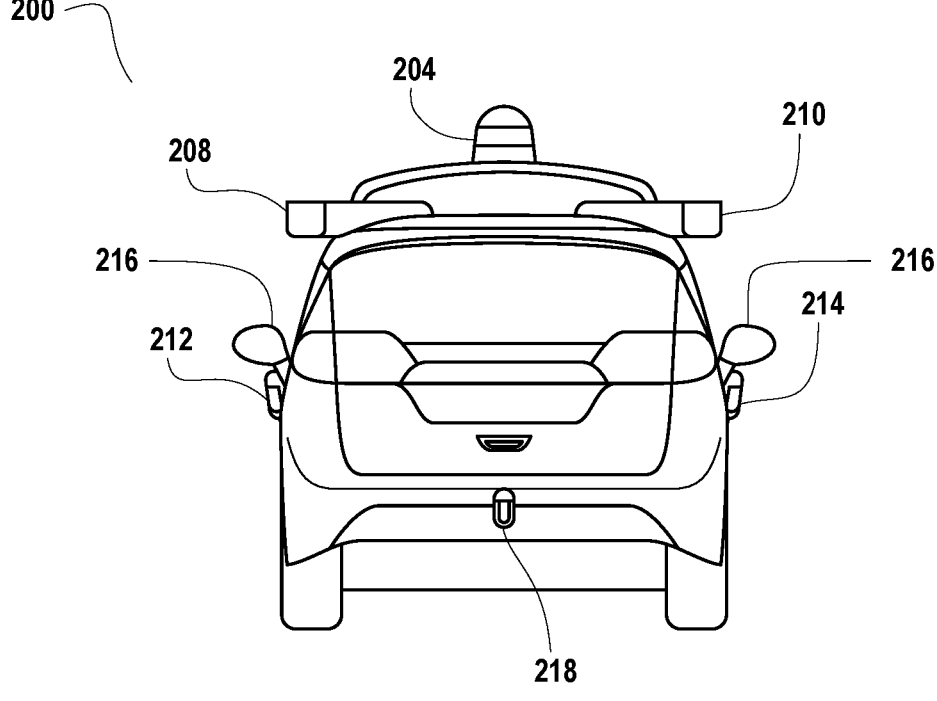
Figure 2E:
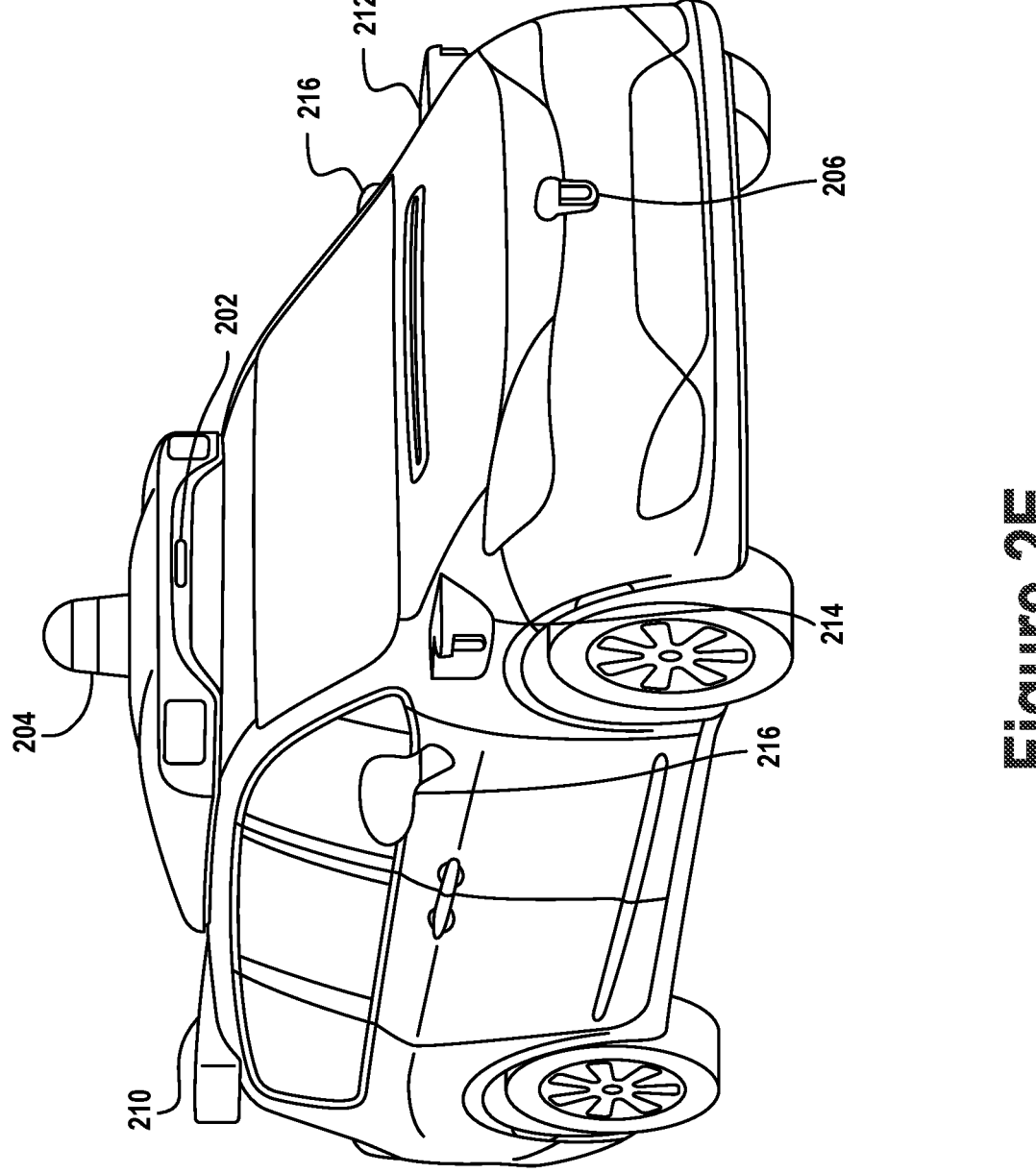
Figure 2F:
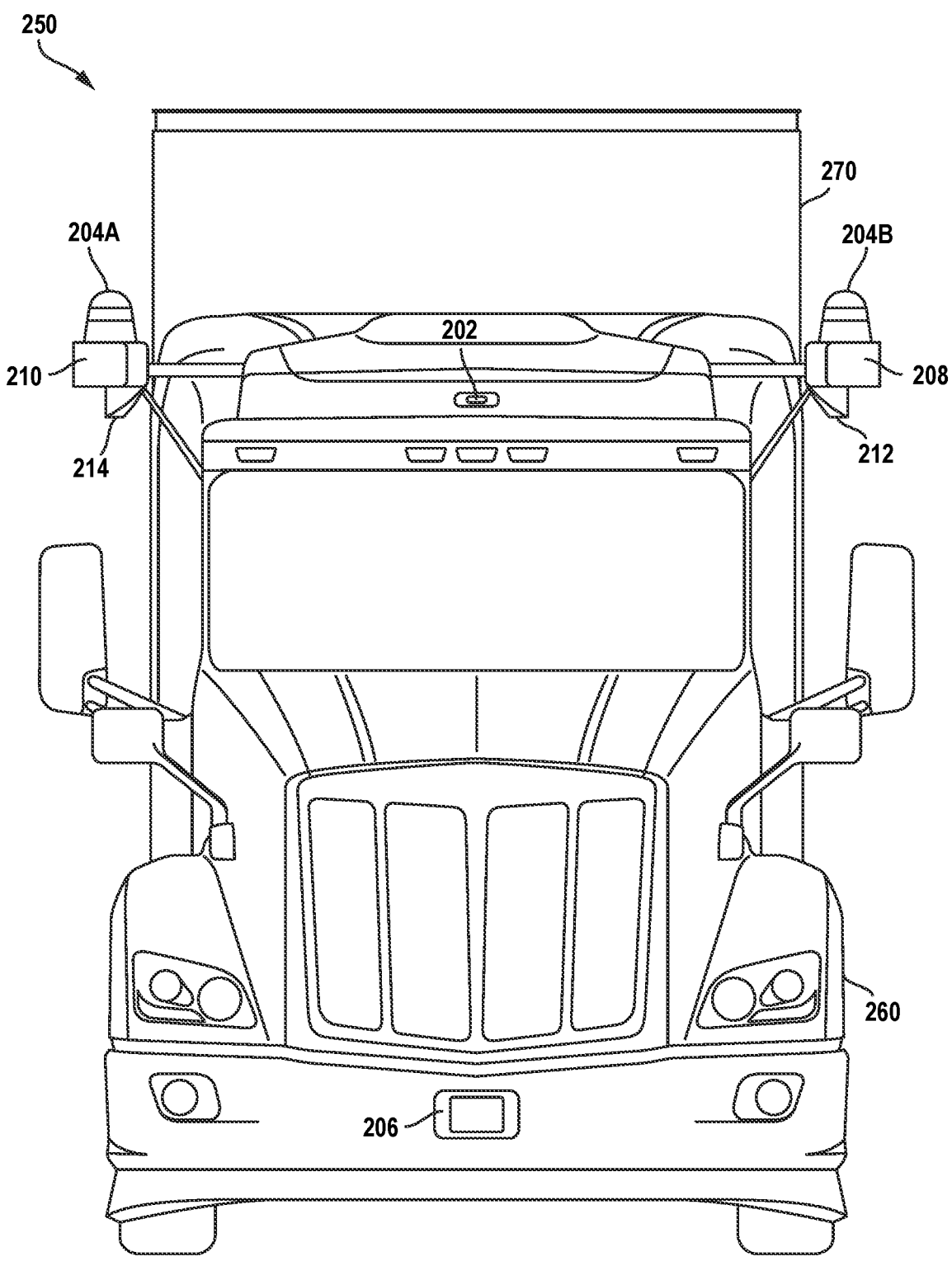
FIGS. 2F, 2G, 2H, and 2I contain illustrations of a physical configuration of a vehicle, in accordance with examples described herein.
Figure 2G:
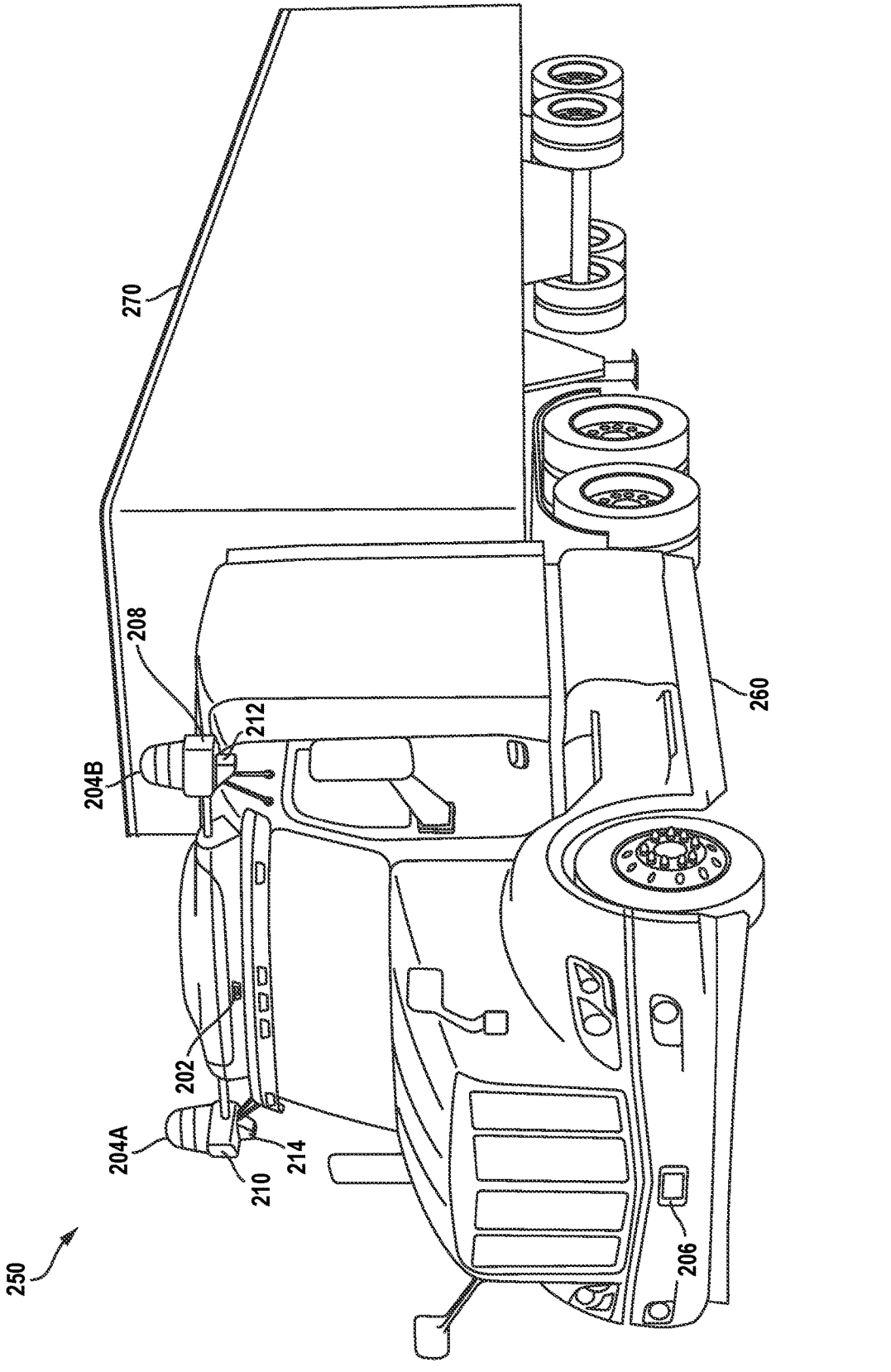
Figure 2H:
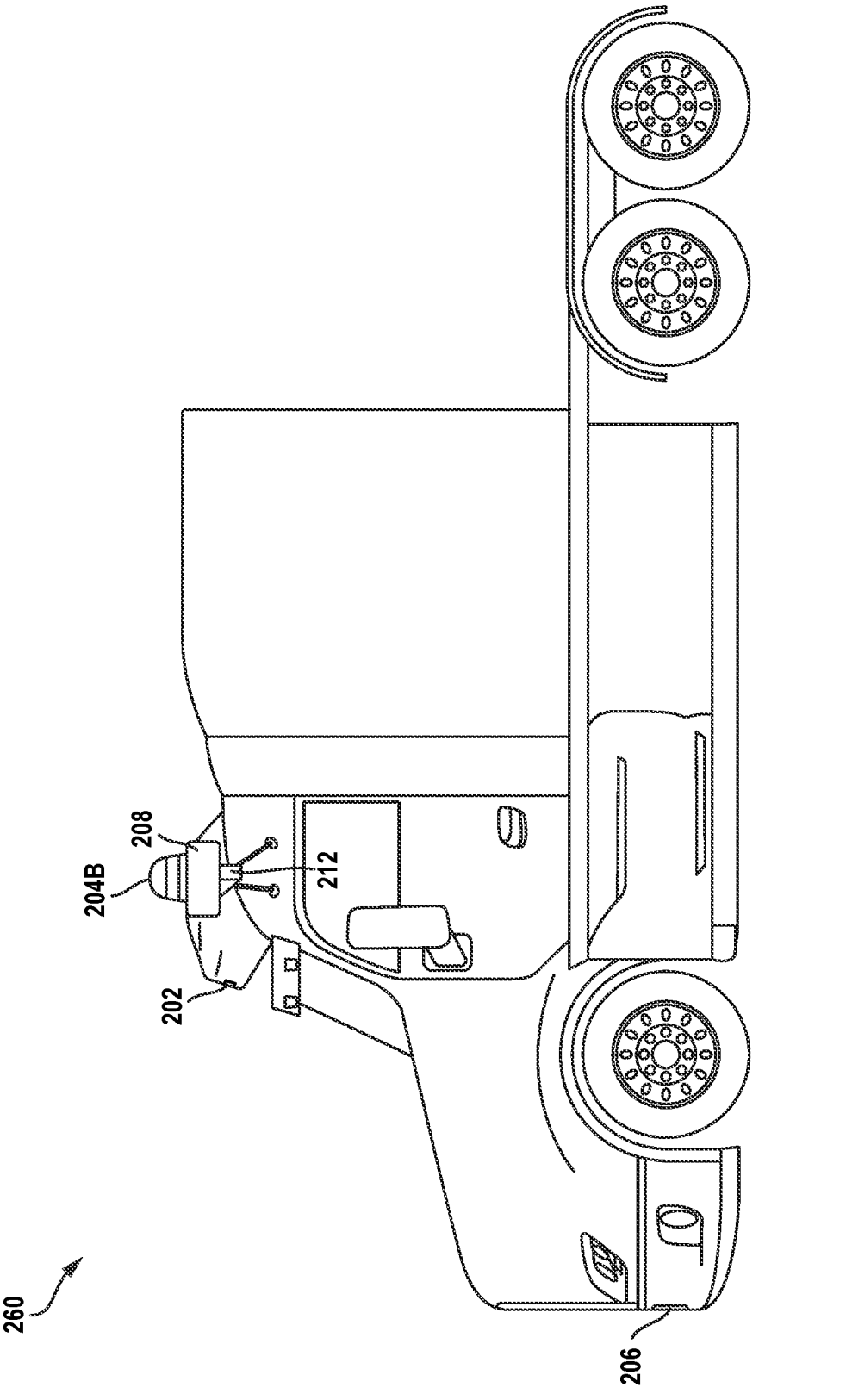
Figure 2I:
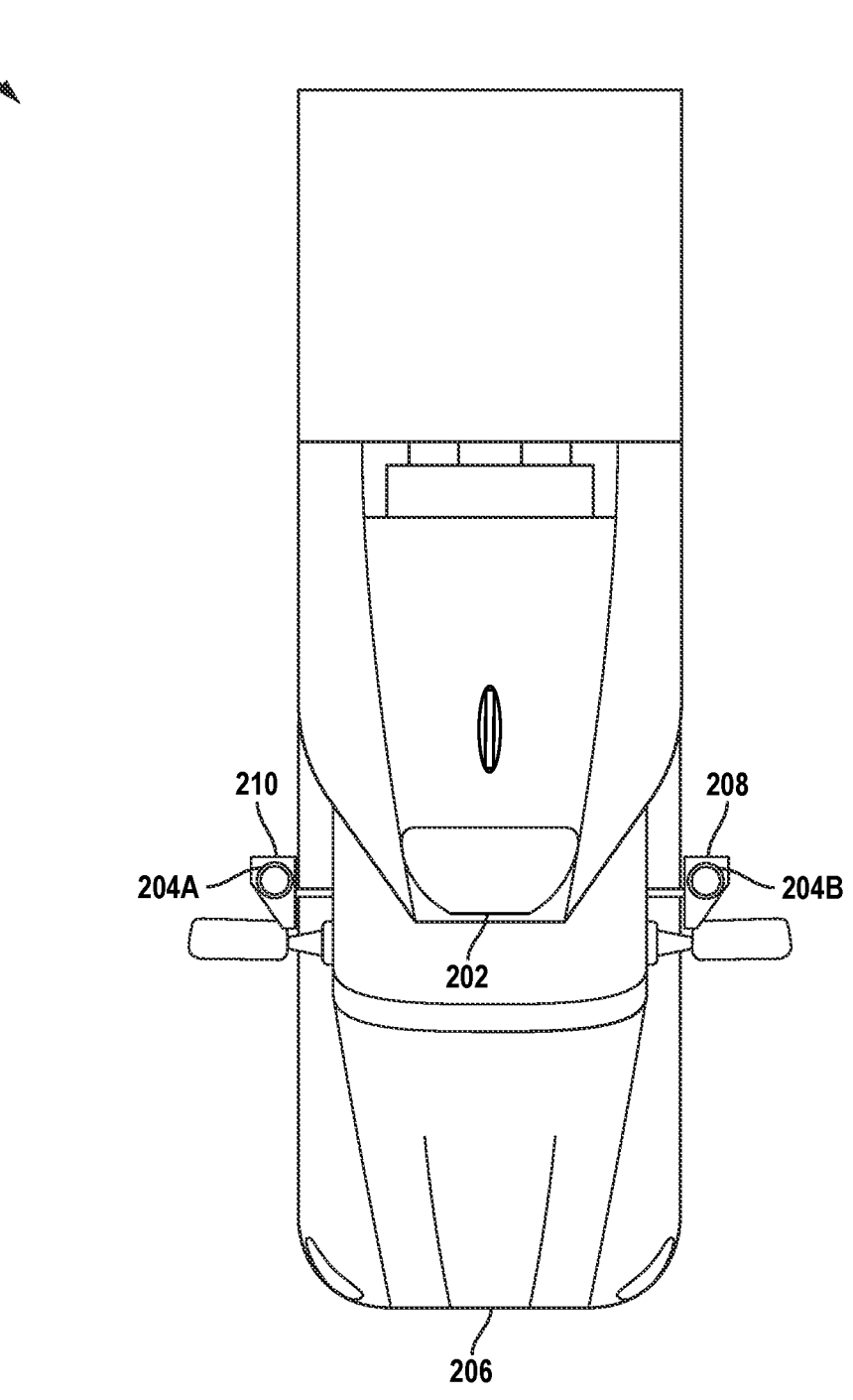

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
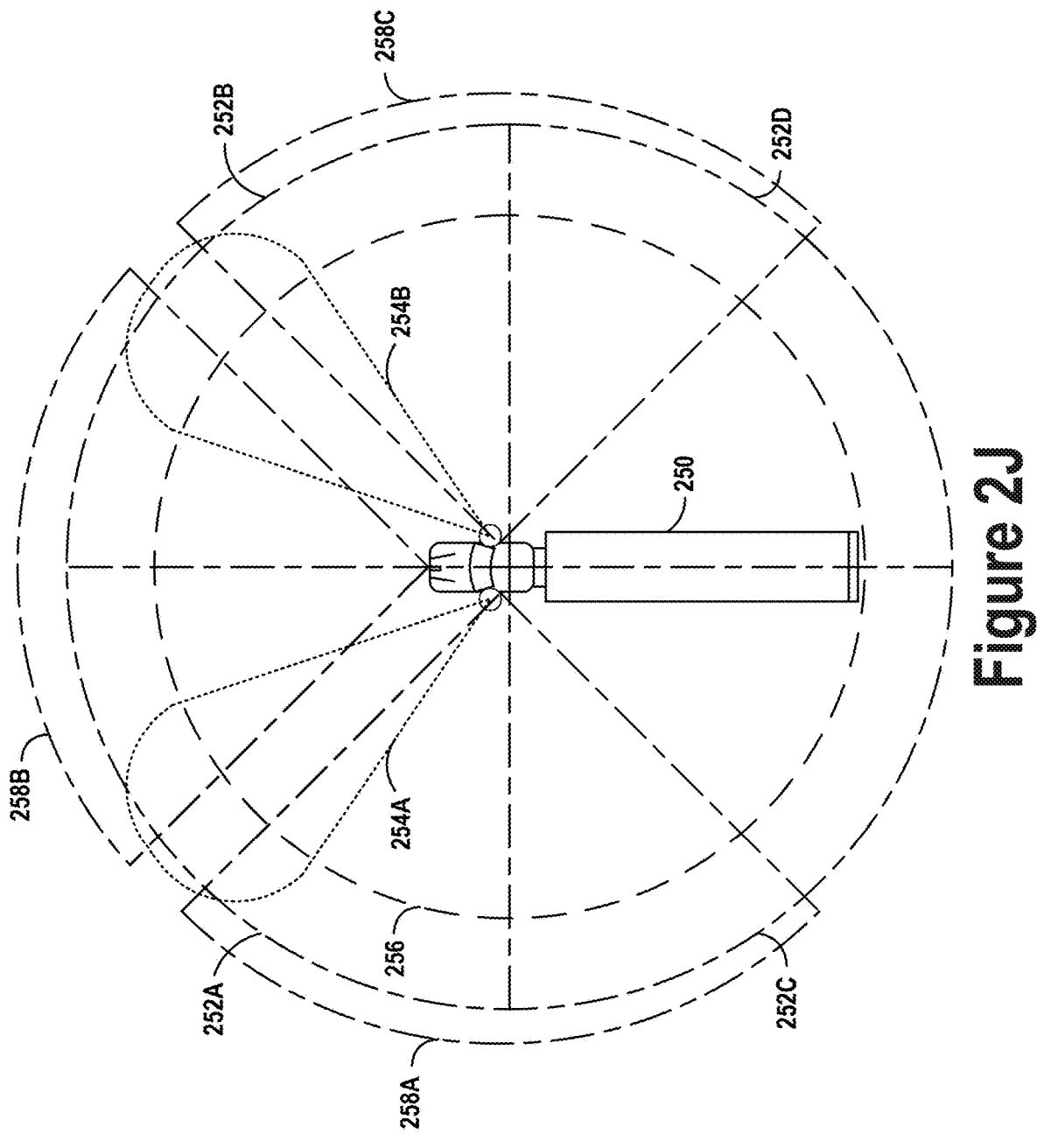
FIG. 2J is an illustration of a field of view for various sensors, in accordance with examples described herein.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
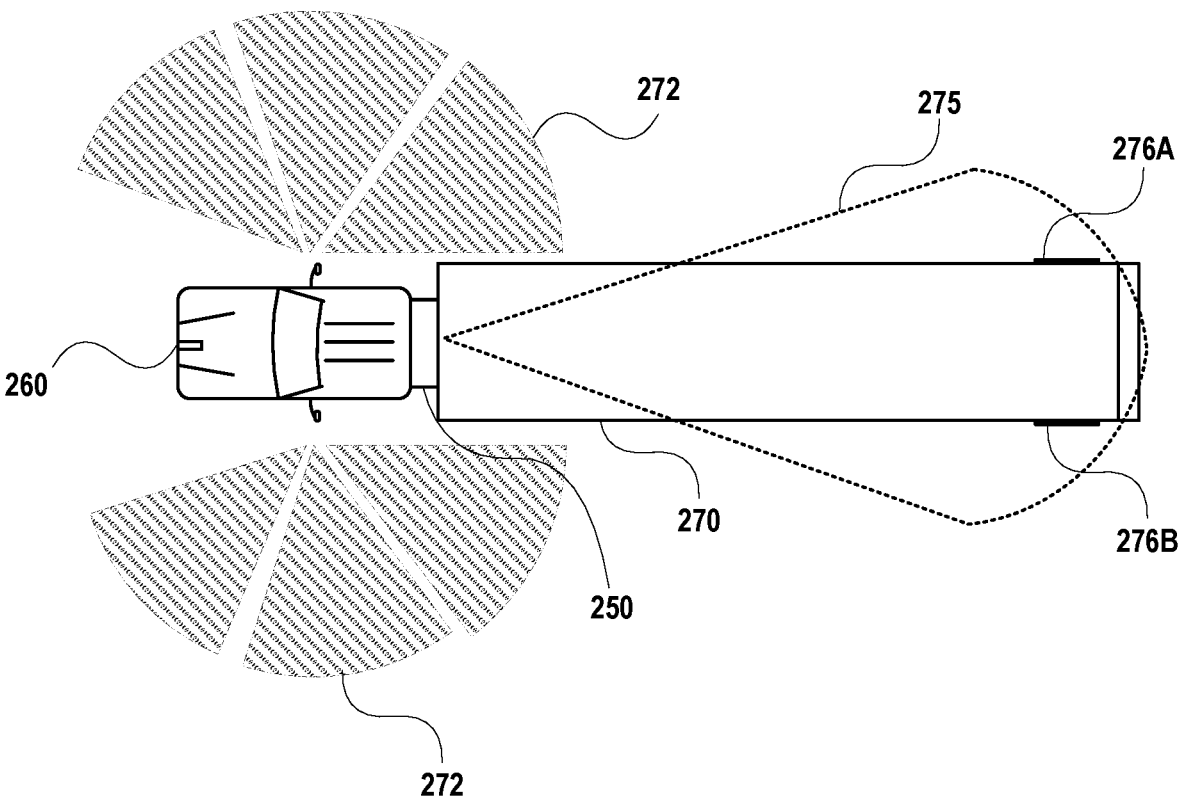
FIG. 2K is an illustration of beam steering for a sensor, in accordance with examples described herein.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
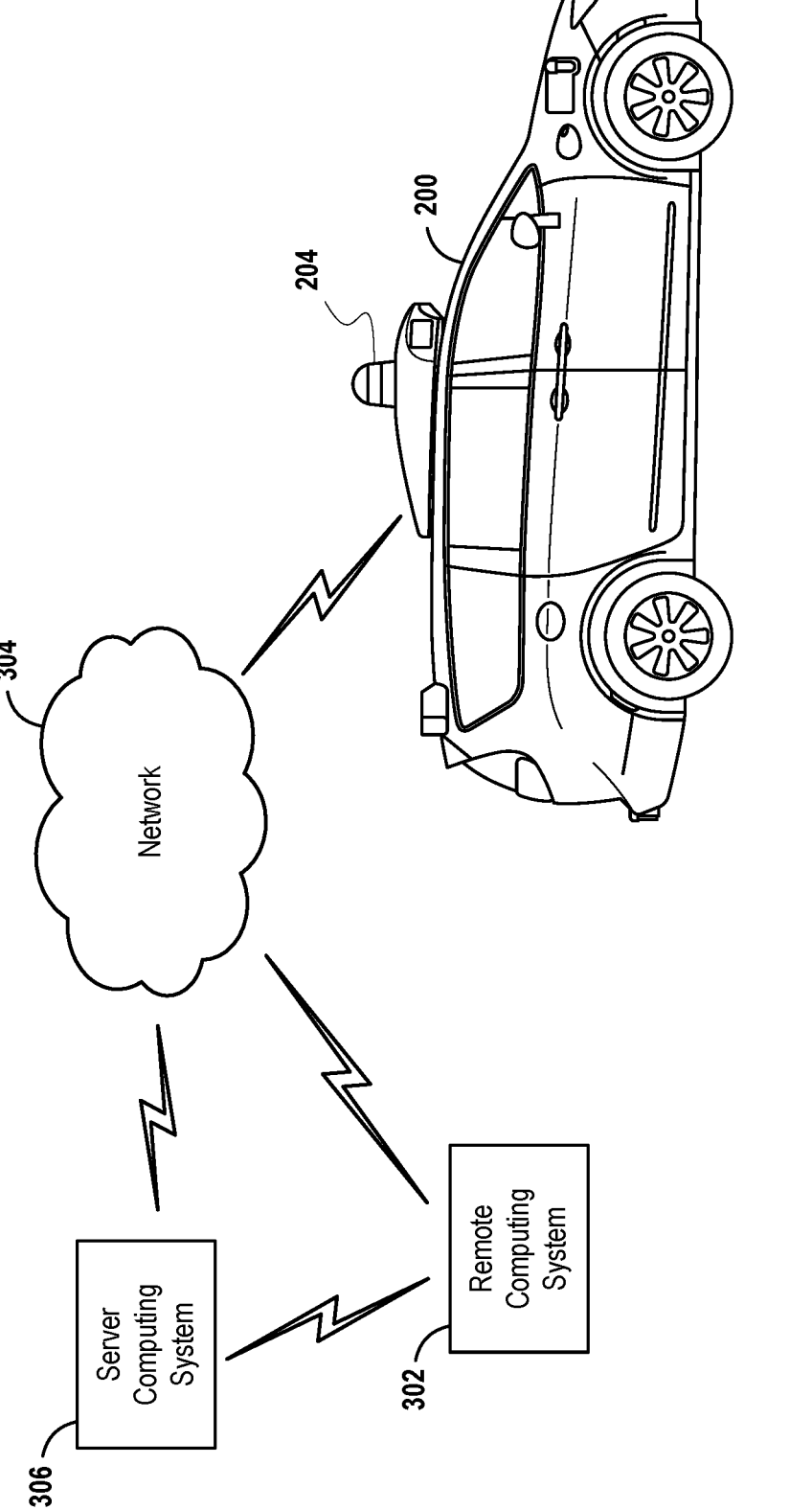
FIG. 3 is a conceptual illustration of wireless communication between various computing systems related to an autonomous or semi-autonomous vehicle, in accordance with examples described herein.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

III. Example Road Object Detection and Grouping System

Figure 4:
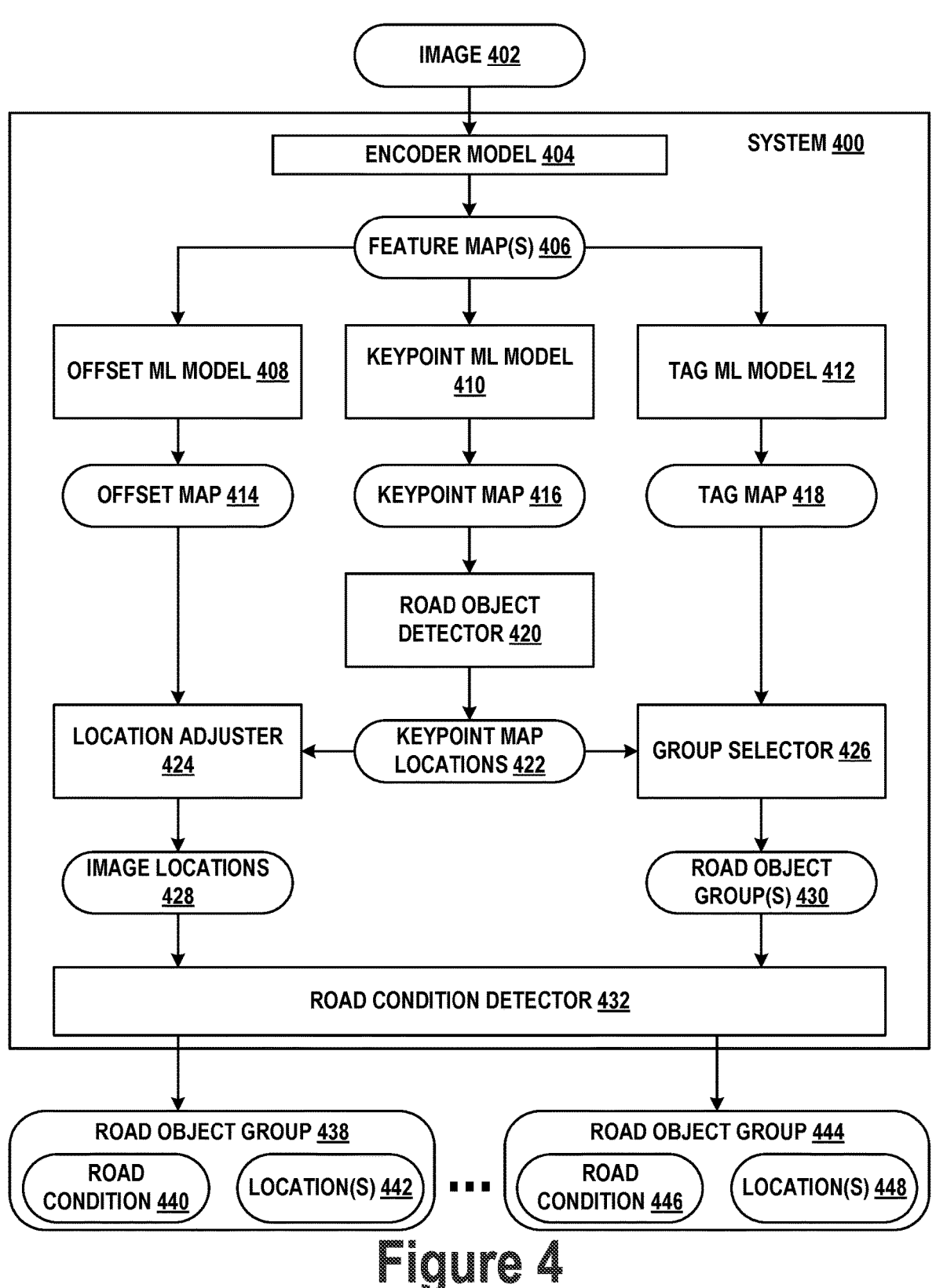
FIG. 4 illustrates a system for joint detection and grouping of road objects, in accordance with examples described herein.

FIG. 4 illustrates an example system that may be used for detection and grouping of road objects. Specifically, system 400 may include encoder model 404, offset machine learning (ML) model 408, keypoint ML model 410, tag ML model 412, road object detector 420, location adjuster 424, group selector 426, and road condition detector 432. System 400 may be configured to identify, based on image 402, one or more groups of road objects. In some cases, system 400 may additionally determine, for each respective group of the one or more groups, (i) a road condition associated with the respective group and (ii) a location of the road condition and/or the road objects that signal the road condition.

Encoder model 404 may be configured to generate feature map(s) 406 based on image 402. Image 402 may represent a plurality of road objects in an environment (e.g., a street, highway, traversable indoor environment, etc.). Feature map (s) 406 may represent the visual content (e.g., features, properties, and/or attributes) detected within image 402 using one or more filters implemented by encoder model 404. Thus, feature map(s) 406 may provide a latent space representation of the visual content of image 402. The latent space representation may, in some cases, be a compressed representation of image 402.

Encoder model 404 may include and/or be based on any trainable machine learning architecture configured to generate a representation of the visual content of an image. For example, encoder model 404 may include and/or be based on the Visual Geometry Group (VGG) architecture, the U-Net architecture, and/or the ResNet architecture, among other possibilities.

Image 402 may have a height of H pixels and a width of W pixels, while each of feature map(s) 406 may have a height of H' pixels and a width of W' pixels, where H' is less than H and W' is less than W. Feature map(s) 406 may include C feature maps, and my thus form a feature volume having a height of H' pixels, a width of W' pixels, and a depth of C pixels. Thus, feature map(s) 406 may alternatively be viewed as a set of H'×W' vectors, each of which includes C values.

The plurality of road objects represented in image 402 may each belong to a particular class. Some spatial arrangements of the plurality of road objects of the particular class may indicate the presence of corresponding road conditions in the environment represented by image 402. For example, a spatial arrangement of a plurality of traffic cones (and/or other similar objects commonly used to indicate a construction zone or road closure) may indicate a construction zone or road closure, while a spatial arrangement of a plurality of static vehicles may indicate a parking lane and/or a congested lane. In some cases, the particular class may be divisible into two or more subclasses. For example, a construction zone road object class may include a traffic cone subclass, a construction sign subclass, a construction vehicle subclass, and/or a construction machinery subclass, among other construction zone-related road objects, each of which is indicative of a presence of a construction zone.

In some cases, image 402 may represent a plurality of sets of two or more road objects, with each respective set of the plurality of sets including road objects belonging to a corresponding class. That is, image 402 may represent groups of road objects of multiple different classes (e.g., both vehicles and traffic cones). In such cases, a corresponding instance of system 400 may be provided for the corresponding class of each respective set, such that different instances of system 400 are specific to the corresponding class of road objects in the respective set. For example, a vehicle-specific instance of system 400 and a construction zone-specific instance of system 400 may be provided, with each instance having been trained using corresponding class-specific training data.

Alternatively or additionally, each of the components of system 400 may be configured to generate corresponding outputs for the corresponding class of each respective set, such that, for example, a corresponding instance of offset map 414, keypoint map 416, tag map 418, keypoint map locations 422, image locations 428, and/or road object group(s) 430 is generated for each respective set. For example, a class-agnostic instance of system 400 may be configured to generate offset map 414, keypoint map 416, tag map 418 each of which includes one or more vehicle-specific channels and one or more construction zone-specific channels.

Offset ML model 408, keypoint ML model 410, and/or tag ML model 412 may each include an artificial neural network, which may take the form of and/or include a multilayer perceptron (MLP), a convolutional neural network, and/or other architecture suitable for determining the respective outputs based on feature map(s) 406. In some implementations, each of offset ML model 408, keypoint ML model 410, and/or tag ML model 412 may operate independently of the outputs of the other ML models, such that these ML models may operate concurrently, in parallel, and/or without serial dependence on one another.

Keypoint ML model 410 may be configured to generate keypoint map 416 based on feature map(s) 406. Keypoint map 416 may include a plurality of pixels, and may, for example, have a height of H' pixels and a width of W' pixels (i.e., same as feature map(s) 406). The corresponding value of each respective pixel of the plurality of pixels of keypoint map 416 may represent a likelihood that the respective pixel represents a predetermined portion of a corresponding road object belonging to the particular class. Thus, keypoint map 416 may be viewed as a heat map (e.g., with a pixel value range of 0 to 1), where higher values indicate a higher likelihood of a road object detection and lower values indicate a lower likelihood of the road object detection.

The predetermined portion of the road object may include, for example, a point along a vertical center line of the corresponding road object (e.g., a bottom-center of the object), a point along a horizontal center line of the corresponding road object, a point on a bounding box of the corresponding road object (e.g., top left and bottom right corners), and/or a center point of the bounding box of the corresponding road object, among other possibilities. In cases where road object detection relies on detecting a plurality of predetermined portions of the road object (e.g., corners of a bounding box), each respective predetermined portion of the plurality of predetermined portions may be provided with a corresponding channel of keypoint map 416 (e.g., resulting in two keypoint map 416 channels for two corners of a bounding box).

Road object detector 420 may be configured to detect, within keypoint map 416, keypoint map locations 422 of road objects detected within image 402. For example, road object detector 420 may be configured to identify pixels of keypoint map 416 that are associated with corresponding values that exceed a threshold value. The threshold value may be selected and/or modified to achieve a target precision value, a target recall value, a target false-positive rate, and/or a target false-negative rate, among other possible considerations. Thus, keypoint map locations 422 may include coordinates within keypoint map 416 at which respective predetermined portions of road objects have been detected.

Offset ML model 408 may be configured to generate offset map 414 based on feature map(s) 406. Since the resolution of keypoint map 416 may be a down-sampled version of the resolution of image 402, keypoint map locations 422 may be inaccurate (relative to the resolution of image 402) by up to the downsampling factor. For example, $$(H', W') = \left(\frac{H}{R}, \frac{W}{R}\right),$$

or R=H/H'=W/W', where R represents the down sampling factor. Thus, offset map 414 may provide, for each respective pixel of keypoint map 416, a corresponding horizontal offset value and a corresponding vertical offset value.

Accordingly, offset map 414 may have the same width and height as keypoint map 416, and may have a depth of two pixels—one channel for the horizontal offset and one channel for the vertical offset (e.g., per keypoint map 416 channel). Offset ML model 408 may thus be configured to correct for any resolution loss caused by down sampling of feature map(s) 406 and/or keypoint map 416 relative to image 402.

Location adjuster 424 may be configured to determine image locations 428 of the road objects based on keypoint map location 422 and offset map 414. Specifically, for each respective location of keypoint map locations 422, location adjuster 424 may be configured to add the corresponding offset value from offset map 414 to each coordinate of the respective location and multiply the resulting sum by the downsampling factor. Specifically, location adjuster 424 may implement the functions $p_x=R(k_x+o_x)$ and $p_y=R(k_y+o_y)$, where R is the down sampling factor, $k_x$ and $k_y$ represent the horizontal coordinate and the vertical coordinate, respectively, of pixel k in keypoint map 416, and $o_x$ and $o_y$ represent the horizontal offset and the vertical offset, respectively, indicated by pixel o in offset map 414 for pixel k in keypoint map 416, and $p_x$ and $p_y$ represent the horizontal coordinate and the vertical coordinate, respectively, in image 402 of pixel p corresponding to pixel k in keypoint map 416. Thus, in some implementations, those pixels in offset map 414 that correspond to keypoint map location 422 may be used by location adjuster 424, while other pixels of offset map 414 may be unused.

Tag ML model 412 may be configured to generate tag map 418 based on feature map(s) 406. Tag map 418 may include, for each respective pixel of keypoint map 416, a corresponding tag value. Accordingly, tag map 418 may have the same width and height as keypoint map 416. The corresponding tag value represented by each pixel of tag map 418 may be, for example, a scalar value or a vector that includes a plurality of values. Thus, when the corresponding tag value is a scalar value, tag map 418 may have a depth of one pixel (e.g., per channel of keypoint map 416). When the corresponding tag value is a vector that includes T tag values, tag map 418 may have a depth of T pixels (e.g., per channel of keypoint map 416).

The corresponding tag value of a respective pixel of tag map 418 may indicate a relationship between (i) a feature represented by a corresponding pixel of keypoint map 416 and (ii) other features represented by corresponding other pixels of keypoint map 416. Stated another way, the corresponding tag value of the respective pixel of tag map 418 may indicate a group membership of a feature represented by the corresponding pixel of keypoint map 416. Specifically, for each respective location of keypoint map locations 422 (which indicates the predetermined portion of the corresponding road object, and thereby indicates a detection thereof), the corresponding tag value in tag map 418 may indicate a road object group to which the corresponding road object detected at the respective location belongs. In some cases, for pixels of keypoint map 416 other than those at and/or near keypoint map locations 422, the corresponding tag values in tag map 418 may or might not meaningfully, correctly, and/or accurately indicate a grouping of the underlying feature, since these other pixels of keypoint map 416 might not be used by system 400.

Group selector 426 may be configured to determine road object group(s) 430 based on tag map 418 and keypoint map locations 422. Road object group(s) 430 may include one or more groups of the road objects detected within image 402, with each group including two or more road objects of the particular class. Group selector 426 may be configured to determine road object group(s) 430 by, for example, clustering the plurality of road objects detected in image 402, as represented by keypoint map locations 422, based on the corresponding tag of each road object, as represented by corresponding pixels of tag map 418. Thus, each respective road object group of road object group(s) 430 may be represented as a cluster of road objects that are associated with similar tag values.

Group selector 426 may perform clustering of the tags of detected road objects using, for example, a mean-shift clustering algorithm, agglomerative hierarchical clustering, a Density-Based Spatial Clustering of Applications with Noise (DBSCAN) algorithm, and/or supervised machine learning equivalents, among other possibilities. Since tag map 418 is used to group detected road objects into road object group(s) 430, the values of tag map 418 might not have a fixed semantic meaning across different images, provided that, for a given image, similar tag values are generated for road objects that belong to the same group. That is, tag map 418 may encode the relationships among road objects using the relative values of different tags, with any group being representable using any tag value.

Additionally or alternatively, group selector 426 may include a tag distance calculator, which may be configured to determine a plurality of distance metrics based on tag map 418 and keypoint map locations 422. The plurality of distance metrics may include a corresponding distance metric for every pair of the road objects detected in image 402, and may thus indicate how similar the tag values of the road objects of every pair are to one another. Group selector 432 may be configured to determine road object group(s) 430 based on the plurality of distance metrics. For example, a pair of detected road objects may be assigned to the same group when the corresponding distance metric does not exceed a threshold distance.

Road condition detector 432 may be configured to determine, for each respective road object group of road object group(s) 430, a corresponding road condition based on (i) image location 428 of the road objects detected within image 402 and (ii) the particular class of these road objects (and, in some cases, based on image 402 as well). Additionally, road condition detector 432 may be configured to generate, for each respective road object group of road object group(s) 430, a corresponding representation of the corresponding road condition and a location associated with the road condition. Thus, for example, road condition detector 432 may be configured to generate a representation of road object group 438 through road object group 444 (i.e., road object groups 438-444). Road condition detector 432 may include one or more rule-based algorithms and/or one or more ML models.

Road object groups 438-444 may represent road object group(s) 430. Road object group 438 may be associated with road condition 440 and location(s) 442, and road object group 444 may be associated with road condition 446 and location(s) 448. Road condition 440 may represent a road condition indicated by the road objects included in road object group 438, and road condition 446 may represent a road condition indicated by the road objects included in road object group 444.

In some implementations, road condition 440 and/or road condition 446 may each be represented as a semantic label that has been selected by road condition detector 432 from a plurality of possible road conditions. The plurality of possible road conditions may include road conditions that a vehicle is configured to operate based on (e.g., respond to, avoid, etc.). The plurality of possible road conditions may include any conditions that are indicated by the presence of a group of two or more road objects. The plurality of possible traffic conditions may include, for example, a construction zone indicated by an arrangement of two or more traffic cones or other similar objects, a parking lane indicated by an arrangement of two or more parked vehicles, a traversable lane indicated by an arrangement of two or more moving vehicles, a congested lane indicated by an arrangement of two or more slowly-moving vehicles, or a pedestrian crossing indicated by an arrangement of two or more pedestrians, among other possibilities.

Location(s) 442 of road condition 440 may represent one or more points, areas, and/or volumes at which road condition 440 is present in the portion of the environment represented by image 402. For example, location(s) 442 may include image locations 428 of the road objects of road object group 438, and/or an area and/or volume associated with (e.g., delineated by, indicated by, or occupied by) these road objects. Location(s) 448 may include commensurate information regarding road condition 446.

Thus, each of the representations of road object groups 438-444 may be provided to a vehicle (e.g., vehicle 100, vehicle 200, vehicle 250) to inform operation of the vehicle. Specifically, the vehicle may be configured to plan its operations based on one or more of road conditions 440-446 detected within image 402. Detecting and grouping of road objects using system 400 may allow the vehicle to respond to road conditions faster due to both detection and grouping of the road objects being performed jointly, concurrently, and/or in parallel, rather than serially.

Specifically, other systems could be configured to first detect the road objects and subsequently determine groups thereof. That is, grouping operations might be performed in response to (i.e., after) the road objects being identified. However, such serial operation may increase the amount of time it takes the vehicle to identify a road condition, since determination of road object grouping may depend on completion of road object detection. Additionally, any errors in object detection may be propagated to, and thus influence the accuracy of, object grouping. Further, identifying road object groups based on more complex representations of the environment, such as point clouds or other three-dimensional models of the environment, may be more computationally expensive, and thus more time-consuming, than processing image 402.

Accordingly, identifying road conditions using system 400 may be less computationally expensive due to reliance on image data, and may allow for joint detection and grouping, thus reducing computational cost and reducing the time to road condition detection. As a result, the vehicle may be safer to operate because it may respond to road conditions faster than might otherwise be possible. This benefit may be especially prominent in the case of larger vehicles, such as semi-trucks, that might be slow to accelerate and decelerate, and thus benefit from early road condition detections.

IV. Example Road Condition

Figure 5A:
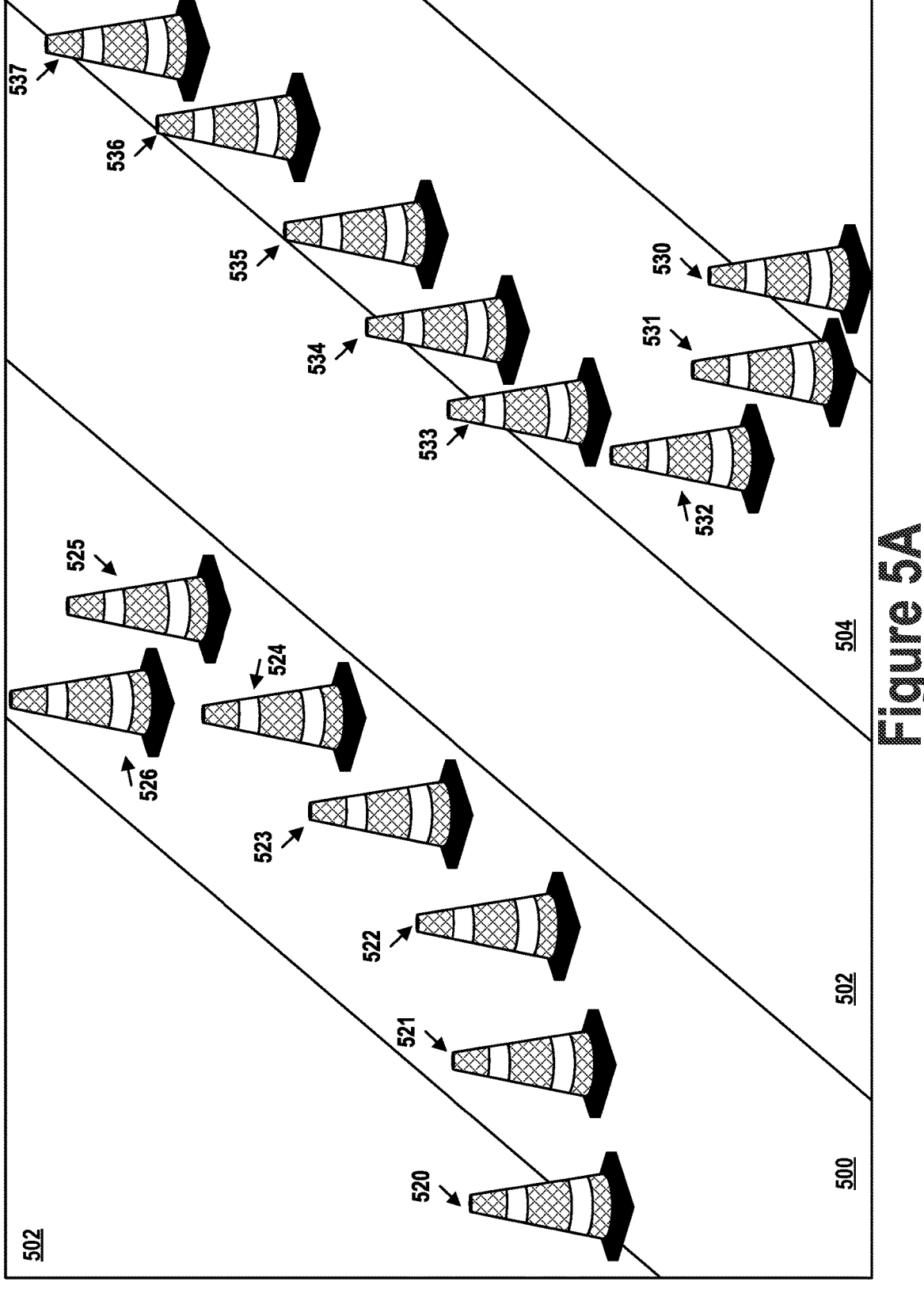
FIG. 5A illustrates an image representing road objects, in accordance with examples described herein.

FIGS. 5A, 5B, 5C, and 5D provide visual illustrations in connection with an example road condition that system 400 may be configured to detect. Specifically, FIG. 5A illustrates image 502, which may be considered an example of image 402. Image 502 represents lane 500, lane 502, and lane 504, each of which may be traversable by a vehicle. Image 502 also represents (i) a first group of traffic cones occupying lane 500, including traffic cones 520, 521, 522, 523, 524, 525, and 526 (i.e., traffic cones 520-526), and (ii) a second group of traffic cones occupying lane 505, including traffic cones 530, 531, 532, 533, 534, 535, 536, and 537 (i.e., traffic cones 530-537).

Figure 5B:
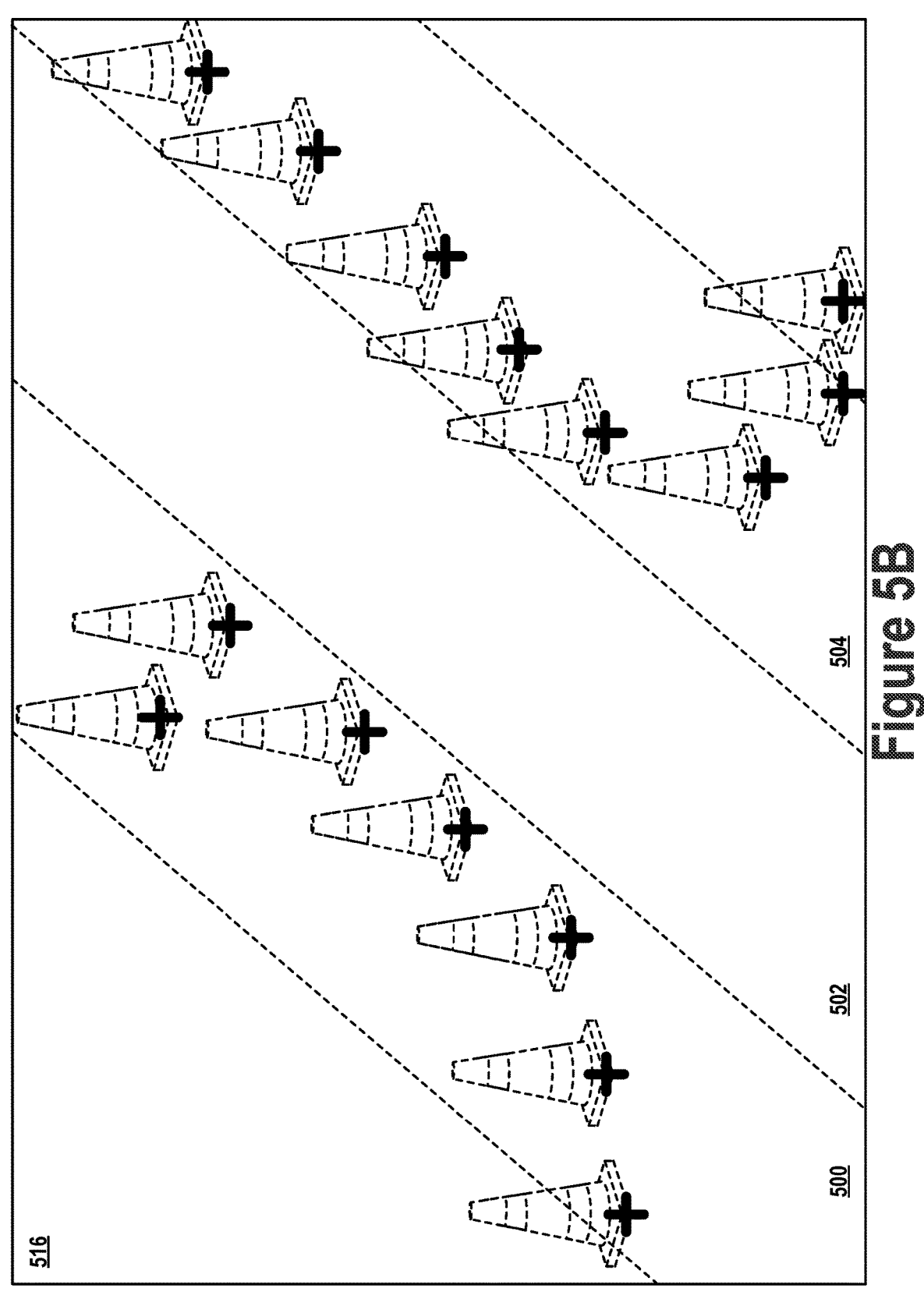
FIG. 5B illustrates a keypoint map, in accordance with examples described herein.

FIG. 5B illustrates keypoint map 516, which may be considered an example of keypoint map 416. Approximate locations of lanes 500, 502, and 504, traffic cones 520-526, and traffic cones 530-537 are shown for reference within keypoint map 516 using dashed lines, although these representations of lanes and traffic cones are not part of keypoint map 516. Pixels within keypoint map 516 that are associated with values that exceed a threshold value, and thus represent detections of respective predetermined portions of road objects, are indicated with a "+" mark. Accordingly, keypoint map 516 indicates a bottom center of each of traffic cones 520-526 and 530-537 with corresponding "+" marks. In other implementations, the keypoint map could instead include corresponding "+" marks at, for example, the centroid of each detected traffic cone.

Figure 5C:
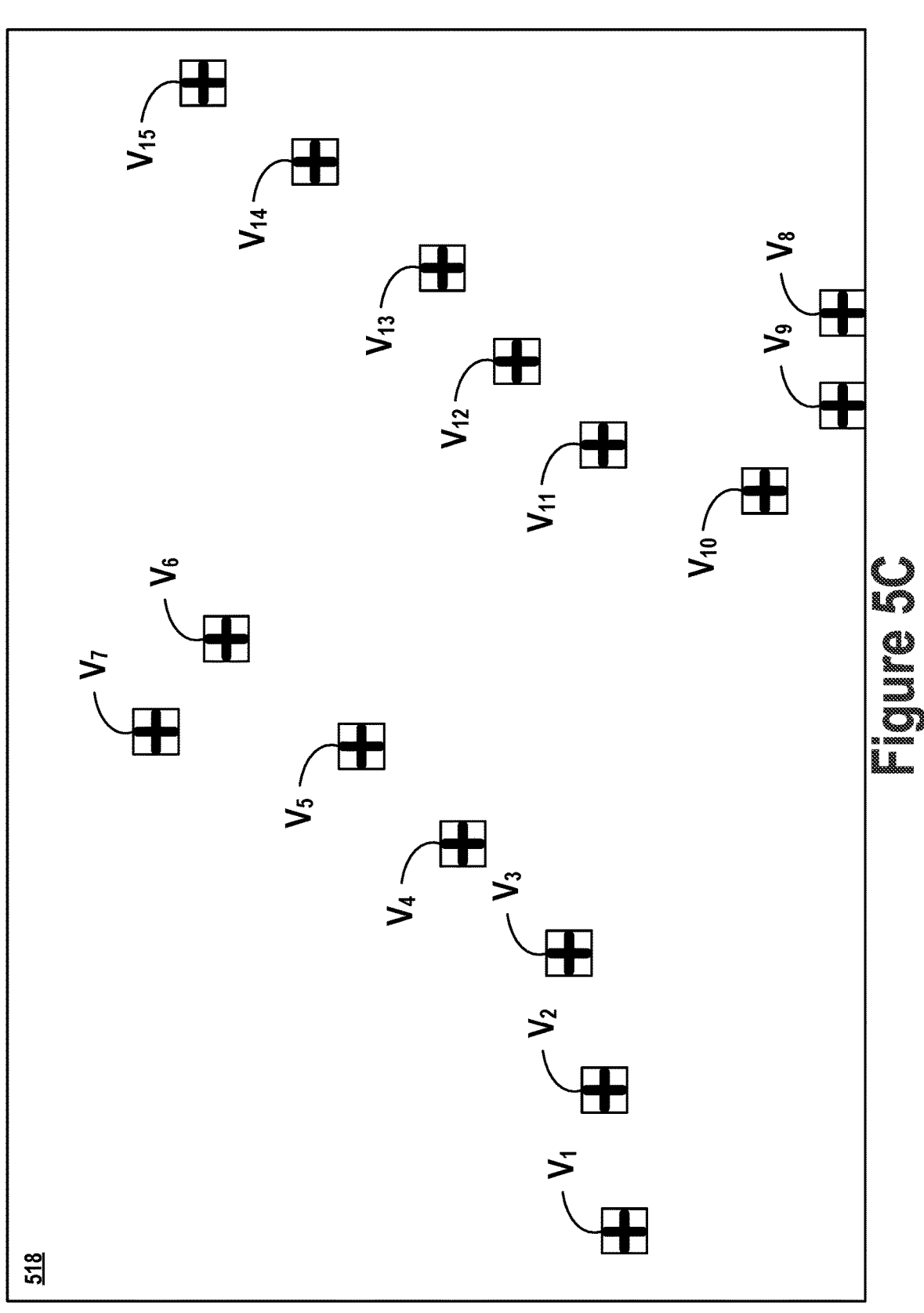
FIG. 5C illustrates a tag map, in accordance with examples described herein.

FIG. 5C illustrates tag map 518, which may be considered an example of tag map 418. Tag map 518 includes, for each respective pixel of keypoint map 516, a corresponding pixel associated with a tag value indicating how the feature represented by the respective pixel relates to other features represented by other pixels of keypoint map 516. Pixels in tag map 518 that correspond to road objects detected in keypoint map 516 are indicated with a corresponding boxed "+" mark and a corresponding tag value. Specifically, tag map 518 indicates that traffic cone 520 is associated with tag value $V_1$, traffic cone 521 is associated with tag value $V_2$, traffic cone 522 is associated with tag value $V_3$, traffic cone 523 is associated with tag value $V_4$, traffic cone 524 is associated with tag value $V_5$, traffic cone 525 is associated with tag value $V_6$, traffic cone 526 is associated with tag value $V_7$ traffic cone 530 is associated with tag value $V_8$, traffic cone 531 is associated with tag value $V_9$, traffic cone 532 is associated with tag value $V_{10}$, traffic cone 533 is associated with tag value $V_{11}$, traffic cone 534 is associated with tag value $V_{12}$, traffic cone 535 is associated with tag value $V_{13}$, traffic cone 536 is associated with tag value $V_{14}$, and traffic cone 537 is associated with tag value $V_{15}$.

As can be seen from image 502 in FIG. 5A, traffic cones 520-526 form the first group of traffic cones that indicate closure of a portion of lane 500, while traffic cones 530-537 form the second group of traffic cones that indicate closure of a portion of lane 504. Accordingly, tag values $V_1$-$V_7$ may be similar to each other (e.g., the difference in magnitude and/or direction therebetween may be less than a threshold value), tag values $V_8$-$V_{15}$ may be similar to each other, and tag values $V_1$-$V_7$ may be dissimilar from tag values $V_8$-$V_{15}$ (e.g., the difference in magnitude and/or direction therebetween may be greater than or equal to the threshold value). Thus, the first group of traffic cones (i.e., traffic cones 520-526) may be considered an example of road object group 438, and the second group of traffic cones (i.e., traffic cones 530-537) may be considered an example of road object group 444.

Figure 5D:
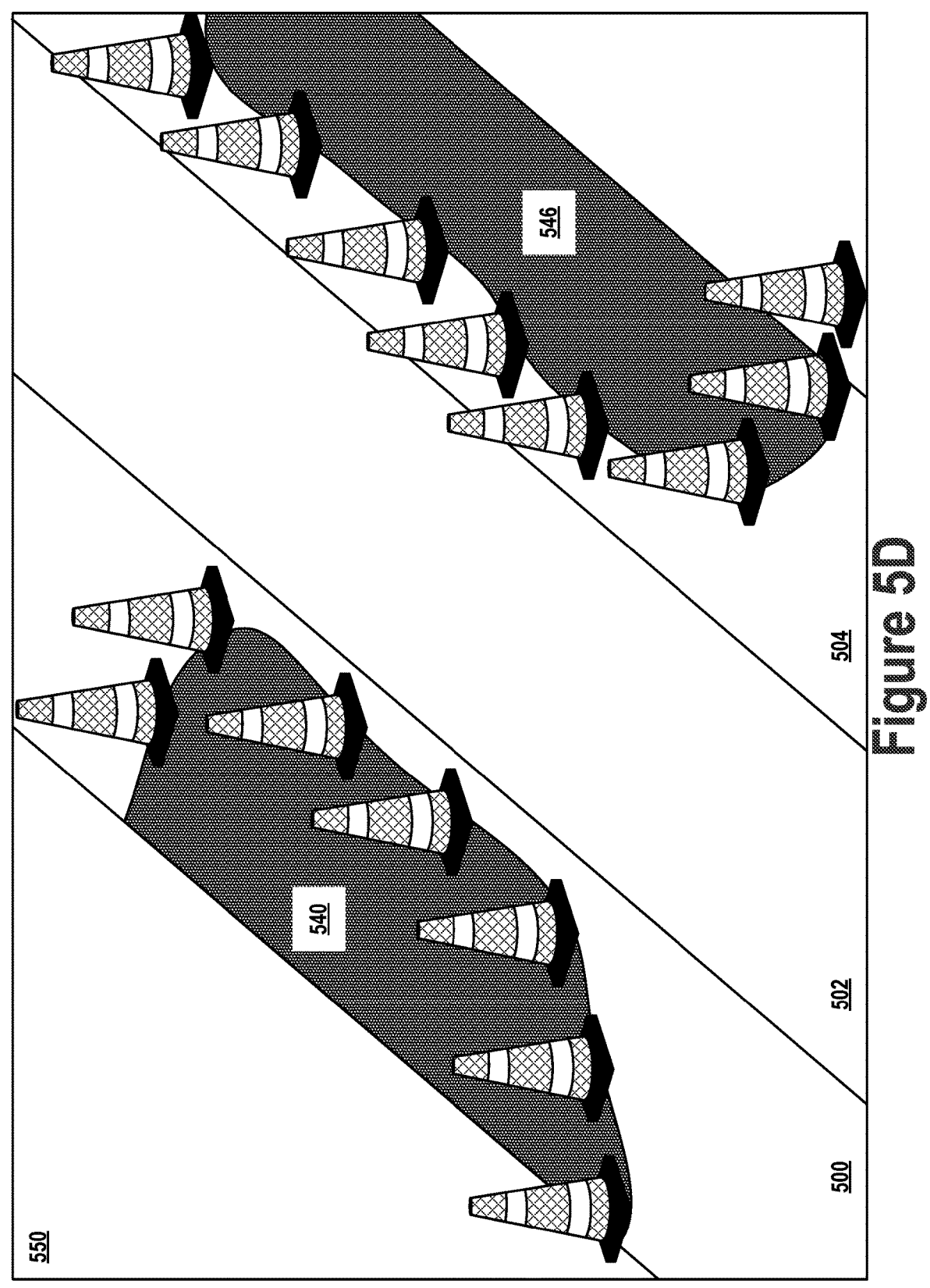
FIG. 5D illustrates an annotated image, in accordance with examples described herein.

FIG. 5D illustrates image 550, which provides a visual illustration of region 540 of lane 500 closed by the first group of traffic cones and region 546 of lane 504 closed by the second group of traffic cones. Thus, region 540 may be considered an example of location(s) 442 and region 546 may be considered an example of location(s) 448, while each of road conditions 440 and 446 may represent a lane closure and/or construction zone, which renders regions 540 and 546 non-traversable.

Region 540 is indicated by traffic cones 520-526 collectively, rather than any one traffic cone individually, and region 546 is indicated by traffic cones 530-537 collectively, rather than any one traffic cone individually. Thus, identification of regions 540 and 546 depends on an accurate grouping of traffic cones 520-526 and 530-537, since other groupings (e.g., treating traffic cones 520-526 and traffic cones 530-537 as part of one group) may result in erroneous determination of construction zones in the wrong parts of the environment (e.g., determining that all of lanes 500, 502, and 504 are blocked), thus causing vehicle behavior that is inconsistent with the rules of the road, expectations of other drivers, and/or expectations of individuals occupying the construction zone, among other possibilities.

In some implementations, the output of system 400 may be an annotated version of image 502 (e.g., similar to image 550) that represents regions 540 and 546 using, for example, a mask or map that delineates regions 540 and 546. In some implementations, the representations of regions 540 and 546 may be transformed into a three-dimensional representation and provided as part of a three-dimensional model of the environment.

V. Example Tag ML Model Architecture

Figure 6:
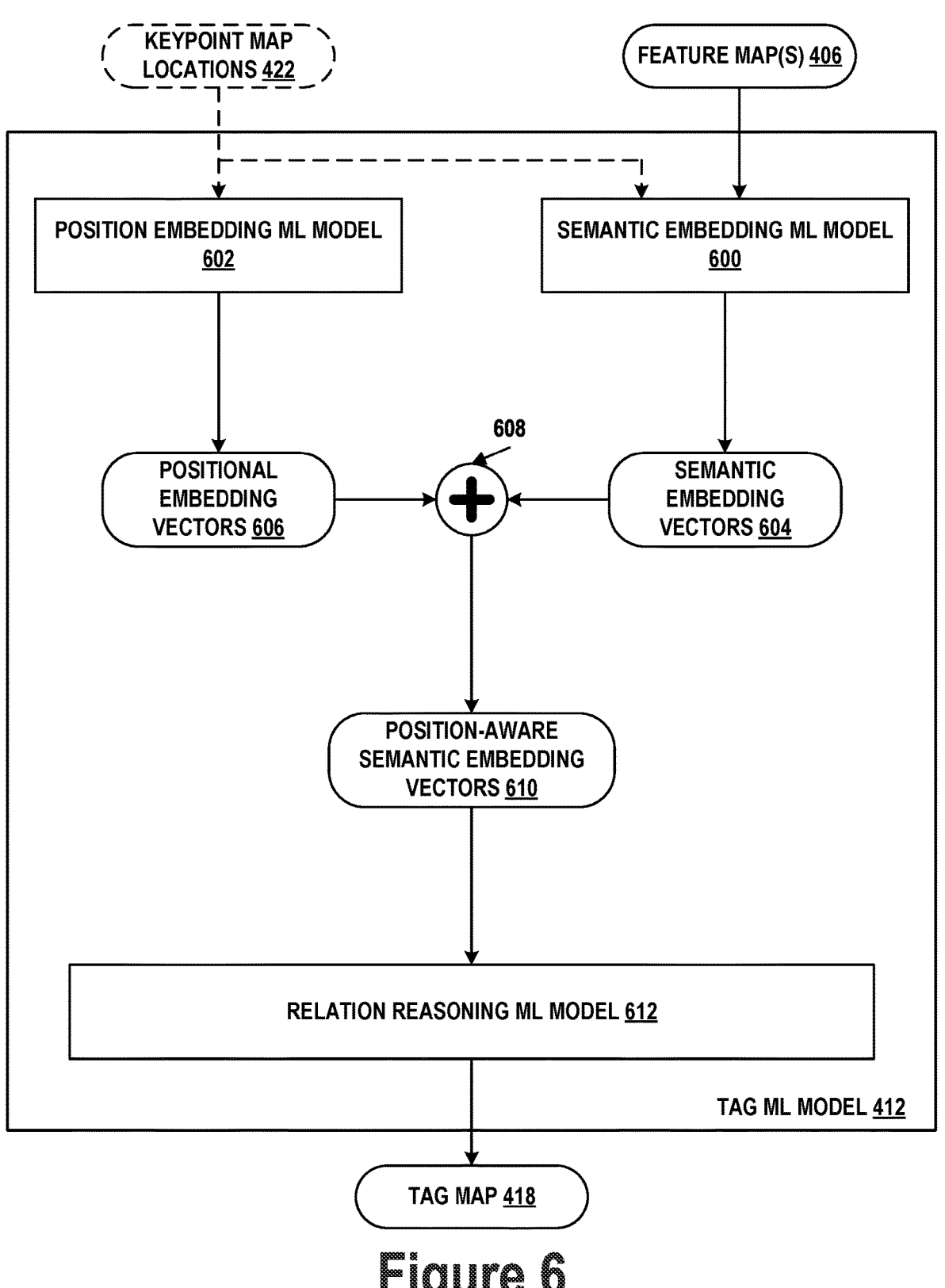
FIG. 6 illustrates aspects of a tag ML model, in accordance with examples described herein.

FIG. 6 illustrates an example implementation of tag ML model 412. Specifically, tag ML model 412 may include position embedding ML model 602, semantic embedding ML model 600, adder 608, and relation reasoning ML model 612.

Position embedding ML model 602 may be configured to generate positional embedding vectors 606 for at least some pixels of keypoint map 416. A positional embedding vector of a corresponding pixel may include a plurality of values that represent coordinates of the corresponding pixel within keypoint map 416. Thus, position embedding ML model 602 may be configured to transform pixel coordinates into a vector, which may include more values than the pixel coordinates. For example, the positional embedding vectors 606 may each have the same dimension as each of semantic embedding vectors 604, thus allowing positional embedding vectors 606 and semantic embedding vectors 604 to be combined (e.g., added or concatenated) and jointly processed by relation reasoning ML model 612. In some cases, positional encodings may be used instead of or in addition to positional embedding vectors 606.

In some implementations, positional embedding vectors 606 may include a corresponding positional embedding vector for every pixel of keypoint map 416. Including a positional embedding vector for each pixel of keypoint map 416 may allow for the semantic and positional information of all pixels of keypoint map 416 to be considered by relation reasoning ML model 612. Thus, position embedding ML model 602 may be configured to generate positional embedding vectors 606 independently of keypoint map location 422 (indicated as an optional input by the dashed lines). In other implementations, positional embedding vectors 606 may include a corresponding positional embedding vector for each of keypoint map locations 422 at which a road object has been detected, but might not include positional embedding vectors for other pixels of keypoint map location 416. Thus, position embedding ML model 602 may be configured to generate positional embedding vectors 606 based on keypoint map location 422, thereby avoiding generating position embedding vectors for pixels of tag map 418 that will not be used by subsequent components of system 400.

Semantic embedding ML model 600 may be configured to generate semantic embedding vectors 604 based on feature map(s) 406. Semantic embedding vectors 604 may represent, for each respective pixel of keypoint map 416, a visual content thereof that is useful for grouping features represented by different pixels. In implementations that provide keypoint map locations 422 as input to semantic embedding ML model 600, semantic embedding vectors 604 may include a corresponding semantic embedding vector for each detected road object (as represented by keypoint map locations 422), but might not include semantic embedding vectors for other pixels of keypoint map 416.

Semantic embedding vectors 604 may be combined with positional embedding vectors 606 to generate position-aware semantic embedding vectors 610. In the example shown in FIG. 6, each respective positional embedding vector of positional embedding vectors 606 may be added, using adder 608, to a (pixel-wise) corresponding semantic embedding vector of semantic embedding vectors 604. In other implementations, positional embedding vectors 606 may instead be concatenated with semantic embedding vectors 604, among other possibilities. In implementations that provide keypoint map locations 422 as input to semantic embedding ML model 600 and position embedding ML model 602, position-aware semantic embedding vectors 610 may include a corresponding position-aware semantic embedding vector for each detected road object (as represented by keypoint map locations 422), but might not include position-aware semantic embedding vectors for other pixels of keypoint map 416.

Relation reasoning ML model 612 may be configured to generate tag map 418 based on position-aware semantic embedding vectors 610. By combining semantic embedding vectors 604, which represent visual content, with positional embedding vectors 606, which represent position, relation reasoning ML model 612 may be able to jointly consider both semantic and positional information in generating tag map 418.

In one implementation, relation reasoning ML model 612 may include a self-attention model. The self-attention model may be configured to determine, for each respective position-aware semantic embedding vector of position-aware semantic embedding vectors 610 (and thus for each respective road object detected in image 402), a corresponding plurality of attention scores representing attention between (i) the respective position-aware semantic embedding vector and (ii) other position-aware semantic embedding vectors of position-aware semantic embedding vectors 610. Thus, relation reasoning ML model 612 may implement the function $A(Q, K, V) = \text{softmax}(QK^T/\sqrt{d_k})V$, where $Q = XW_Q$, $K = XW_K$, $V = XW_V$, A represents the attention scores, X represents position-aware semantic embedding vectors 610, $W_Q$, $W_K$, and $W_V$ represent learned linear transformations configured to generate, respectively, the query matrix Q, the key matrix K, and the value matrix V, and $\sqrt{d_k}$ is a scaling factor. Accordingly, the self-attention model may allow semantic and positional information to be shared across different road objects.

In another implementation, relation reasoning ML model 612 may include a graph neural network. Each position-aware semantic embedding vector 610 may be represented as a node of a graph. Each node of the graph may be connected to all other nodes of the graph, where the other nodes represent other position-aware embedding vectors of position-aware embedding vectors 610. Relation reasoning ML model 612 may be configured to update each respective node of the graph by processing, using the graph neural network, (i) a current state (i.e., current position-aware semantic embedding) of the respective node and (ii) respective current states of all the other nodes connected to the respective node. Tag map 418 may be generated based on one or more iterations (e.g., a plurality of iterations) of processing each of the nodes by the graph neural network. Thus, the graph neural network may allow semantic and positional information to be shared across nodes.

VI. Example Training System

Figure 7:
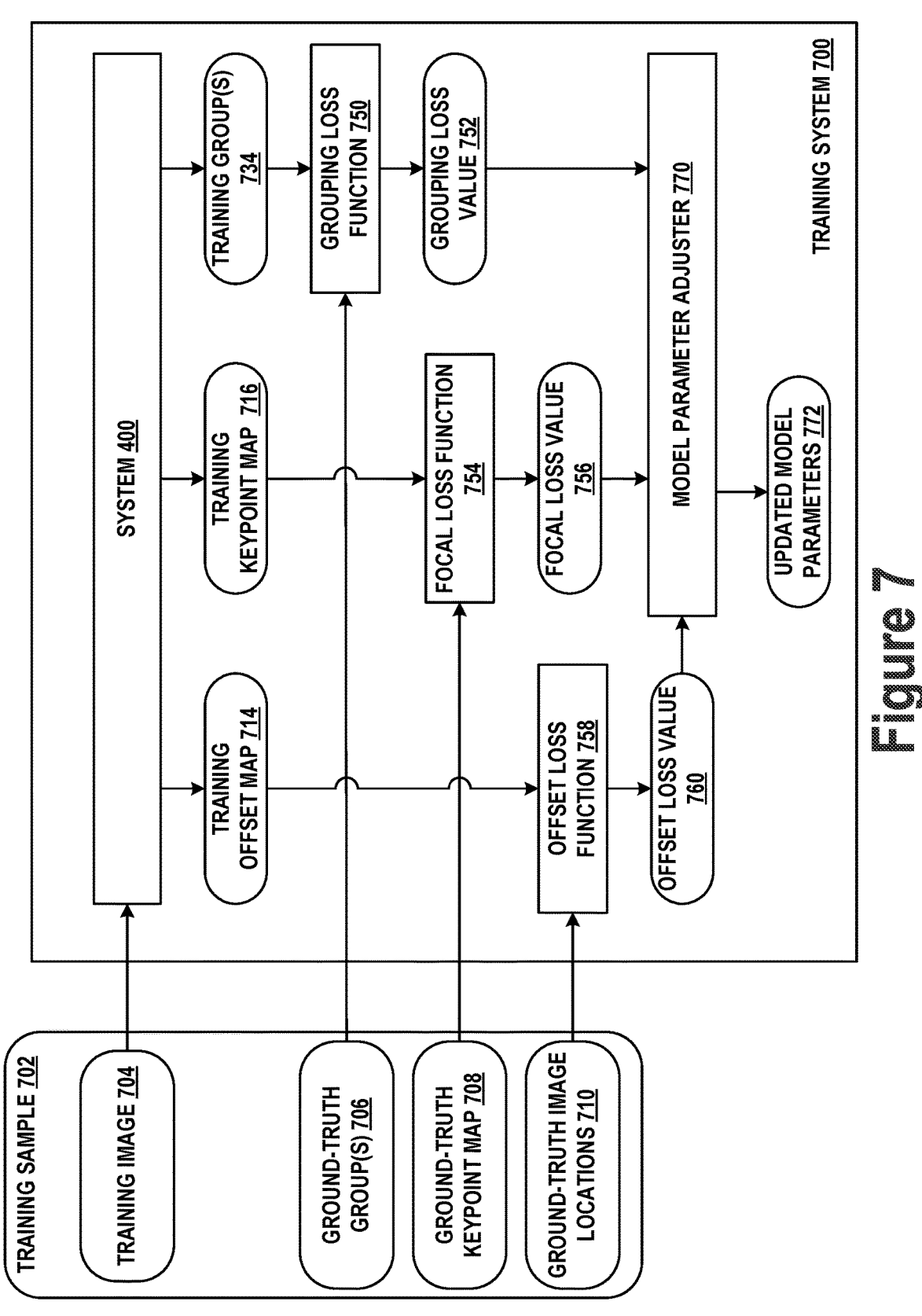
FIG. 7 illustrates a training system, in accordance with examples described herein.

FIG. 7 illustrates an example training system 700, which may be used to train one or more components of system 400. Specifically, training system 700 may include system 400, offset loss function 758, focal loss function 754, grouping loss function 750, and model parameter adjuster 770. Training system 700 may be configured to determine updated model parameters 772 based on training sample 702. Updated model parameters 772 may be applied to system 400 to improve the performance thereof.

Training sample 702 may include training image 704, ground-truth group(s) 706, ground-truth keypoint map 708, and ground-truth image locations 710. Training image 704 may be analogous to image 402, but may be processed at training time rather than at inference time. Ground-truth image locations 710 may represent correct locations within training image 704 of road objects of a particular class found in training image 704, and may provide supervision for training at least offset ML model 408. Ground-truth keypoint map 708 may represent, at a down-sampled scale, correct locations of the road objects of the particular class found in training image 704, and may provide supervision for training at least keypoint ML model 410. Ground-truth group(s) 706 may represent a correct grouping of the road objects of the particular class found in training image 704, and may provide supervision for training at least tag ML model 412.

System 400 may be configured to generate, based on training image 704, training keypoint map 716 (which may be analogous to keypoint map 416), training offset map 714 (which may be analogous to offset map 414), and training group(s) 734, which may be analogous to road object group(s) 430. Thus, training keypoint map 716 may represent training road object detections in training image 704. Training offset map 714 may correct for resolution loss in training keypoint map 716 due to downsampling. Training group(s) 734 may represent groupings of related training objects detected within training image 704.

An accuracy with which system 400 identifies road objects of the particular class in training image 704 (as represented by training keypoint map 716) may be quantified using, for example, focal loss function 754, among other possibilities. Specifically, focal loss function 754 may be configured to generate focal loss value 756 based on training keypoint map 716 and ground-truth keypoint map 708. Focal loss function 754 may be expressed as $$L_{FOCAL} = \frac{-1}{N} \sum_{xy} \begin{cases} (1 - \hat{Y}_{xy})^\alpha \log(\hat{Y}_{xy}) & \text{if } Y_{xy} = 1 \\ (1 - Y_{xy})^\beta (\hat{Y}_{xy})^\alpha \log(1 - \hat{Y}_{xy}) & \text{otherwise} \end{cases},$$

where $Y_{xy}$ represents a value of ground-truth keypoint map 708 at pixel coordinates xy, $\hat{Y}_{xy}$ represents a value of training keypoint map 714 at pixel coordinates xy, N represents the number of pixels in keypoint maps 708 and 716, and $\alpha$ and β are adjustable parameters that may be tuned to focus learning on difficult training samples.

An accuracy with which system 400 generates training offset map 714 may be quantified using, for example, offset loss function 758, among other possibilities. Specifically, offset loss function 758 may be configured to generate offset loss value 760 based on training offset map 714 and ground-truth image locations 710. Offset loss function 758 may be expressed as $$L_{OFFSET} = \frac{1}{N} \sum_p \left| O_{\hat{p}} - \left( \frac{p}{R} - \hat{p} \right) \right|,$$

where p iterates through pixels of ground-truth keypoint map 708 at which road object have been detected (i.e., p represents ground-truth keypoint road object locations), $$\hat{p} = \left\lfloor \frac{p}{R} \right\rfloor \left( \text{i.e., the floor of } \frac{p}{R} \right)$$

selects the highest integer that is less than or equal to $$\frac{p}{R}, R = H/H' = W/W',$$

and $O_{\hat{p}}$ represents the value of training offset map 714 at pixel $\hat{p}$.

An accuracy with which system 400 groups the road objects of the particular class in training image 704 (as represented by training group(s) 734) may be quantified using, for example, grouping loss function 750, among other possibilities. Specifically, grouping loss function 750 may be configured to generate grouping loss value 752 based on training group(s) 734 and ground-truth group(s) 706. Grouping loss function 750 may be expressed as $$L_{GROUPING} =$$

$$\frac{1}{N} \sum_n \frac{1}{K_n} \sum_k d(h_n, h_n^k) + \frac{1}{N^2} \sum_n \sum_{n'} \exp(-d(h_n, h_{n'})^2 / 2\sigma^2).$$

The term $$\frac{1}{N} \sum_n \frac{1}{K_n} \sum_k d(h_n, h_n^k)$$

represents a within-group loss that causes tag values of road objects within the same ground-truth group to attempt to converge to the same tag value (e.g., such that tag values of road objects within the same ground-truth group are as close to each other as possible). The term $$\frac{1}{N^2} \sum_n \sum_{n'} \exp(-d(h_n, h_{n'})^2 / 2\sigma^2)$$

represents a cross-group loss that causes tag values of road objects within different ground-truth groups to attempt to diverge from one another. The term $$h_n = \frac{1}{K_n} \sum_k h_n^k$$

represents a reference embedding for ground-truth group n based on the tag values $$h_n^k$$

of each road object k in ground-truth group n. The function d( ) represents a distance function (e.g., Euclidean distance, cosine distance, etc.), n iterates through all ground-truth groups of N ground-truth groups, k iterates through all road objects of K road objects in ground-truth group n, n' iterates through all N ground-truth groups other than the ground-truth group denoted by n, and σ is an adjustable training parameter.

Model parameter adjuster 770 may be configured to determine updated model parameters 772 based on offset loss value 760, focal loss value 756, grouping loss value 752, and/or possibly other loss values that may be determined by other loss functions of training system 700. For example, model parameter adjuster 770 may be configured to determine a total loss value based on a weighted sum of these loss values, where the relative weight of the corresponding loss values may be an adjustable training parameter. Updated model parameters 772 may include one or more updated parameters of any trainable component of system 400, including, for example, encoder model 404, offset ML model 408, keypoint ML model 410, tag ML model 412, group selector 426, and/or road condition detector 432, among other possibilities.

Model parameter adjuster 770 may be configured to determine updated model parameters 772 by, for example, determining a gradient of offset loss function 758, focal loss function 754, grouping loss function 750, and/or the total loss function. Based on this gradient and the respective loss values, model parameter adjuster 770 may be configured to select updated model parameters 772 that are expected to reduce the respective loss values, and thus improve performance of system 400. After applying updated model parameters 772 to system 400, the operations discussed above may be repeated to compute another instance of the respective loss values and, based thereon, another instance of updated model parameters 772 may be determined and applied to system 400 to further improve the performance thereof. Such training of system 400 may be repeated until, for example, the total loss value is reduced to below a target threshold loss value and/or each of offset loss value 760, focal loss value 756, and grouping loss value 752 is reduced below a respective target threshold loss value.

VII. Additional Example Operations

FIG. 8 illustrates a flow chart of operations related to joint detection and grouping of road objects. The operations may be carried out by vehicle 100, vehicle 200, vehicle 250, remote computing system 302, server computing system 306, system 400, and/or training system 700, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining an image representing a plurality of road objects belonging to a particular class.

Block 802 may involve generating, using an encoder model and based on the image, a plurality of feature maps that represent visual features of the image.

Block 804 may involve determining, based on the plurality of feature maps and for each respective road object of the plurality of road objects, a corresponding location at which the respective road object has been detected within the image.

Block 806 may involve determining, based on the plurality of feature maps and for each respective road object of the plurality of road objects, a corresponding tag value associated with the respective road object.

Block 808 may involve determining one or more groups of the plurality of road objects based on the tag value of each respective road object of the plurality of road objects. Each respective group of the one or more groups may include two or more corresponding road objects.

Block 810 may involve identifying, for each respective group of the one or more groups, a corresponding road condition based on (i) the corresponding locations of the two or more corresponding road objects in the respective group and (ii) the particular class of the plurality of road objects.

Block 812 may involve generating an output that represents the corresponding road condition of each respective group of the one or more groups.

In some embodiments, determining the corresponding location at which each respective road object has been detected within the image may include generating, based on the plurality of feature maps and using a keypoint machine learning model, a keypoint map that includes a plurality of pixels. A corresponding value of each respective pixel of the plurality of pixels may indicate a likelihood that the respective pixel represents a predetermined portion of a corresponding road object of the plurality of road objects. Determining the corresponding location at which each respective road object has been detected within the image may also include identifying, within the keypoint map, two or more pixels associated with corresponding values that exceed a threshold value. Respective positions of the two or more pixels within the keypoint map may represent the corresponding locations of the plurality of road objects.

In some embodiments, the predetermined portion of the corresponding road object may include one or more of: (i) a point along a vertical center line of the corresponding road object, (ii) a point along a horizontal center line of the corresponding road object, (iii) a point on a bounding box of the corresponding road object, and/or (iv) a center point of the bounding box of the corresponding road object.

In some embodiments, determining the corresponding location at which the respective road object has been detected within the image may include determining, using an offset machine learning model and based on the plurality of feature maps, an offset map that represents, for each respective pixel of the plurality of pixels of the keypoint map, a corresponding offset between (i) a location of the respective pixel within the keypoint map and (ii) a location within the image of a feature represented by the respective pixel. Determining the corresponding location at which the respective road object has been detected within the image may also include determining, for each respective road object of the plurality of road objects, a corresponding location of the respective road object within the image by adding (i) the corresponding offset to (ii) a corresponding location of the respective road object within the keypoint map.

In some embodiments, determining the corresponding tag value may include generating, using a tag machine learning model, based on the plurality of feature maps, and for each respective pixel of the plurality of pixels of the keypoint map, a corresponding vector that includes a plurality of values and is configured to indicate a group to which an object represented by the respective pixel belongs.

In some embodiments, determining the one or more groups may include determining, for each respective road object of the plurality of road objects, one or more corresponding distance metrics between (i) the corresponding vector associated with a pixel in the keypoint map that represents the predetermined portion of the respective road object and (ii) one or more vectors associated with one or more other pixels in the keypoint map that represent respective predetermined portions of one or more other road objects of the plurality of road objects. Determining the one or more groups may also include partitioning the plurality of road objects into the one or more groups based on the one or more corresponding distance metrics of each respective road object of the plurality of road objects.

In some embodiments, determining the corresponding tag value may include generating, using a tag machine learning model, based on the plurality of feature maps, and for each respective pixel of the plurality of pixels of the keypoint map, a corresponding scalar value associated with the respective pixel and configured to indicate a group to which an object represented by the respective pixel belongs.

In some embodiments, determining the one or more groups may include determining, for each respective road object of the plurality of road objects, the corresponding scalar value associated with a pixel in the keypoint map that represents the predetermined portion of the respective road object. Determining the one or more groups may also include partitioning the plurality of road objects into the one or more groups based on the corresponding scalar value of each respective road object of the plurality of road objects.

In some embodiments, the corresponding tag value may be determined by a tag machine learning model that includes a semantic embedding model and a relation reasoning ML model. Determining the corresponding tag value may include generating, using the semantic embedding model, based on the plurality of feature maps, and for each respective road object of the plurality of road objects, a corresponding semantic embedding vector. Determining the corresponding tag value may also include generating, for each respective road object of the plurality of road objects, a corresponding position-aware semantic embedding vector by combining (i) the corresponding semantic embedding vector of the respective road object with (ii) a positional embedding vector of the respective road object. Determining the corresponding tag value may further include generating, using the relation reasoning ML model and for each respective road object of the plurality of road objects, the corresponding tag value based on the corresponding position-aware semantic embedding vector.

In some embodiments, the relation reasoning ML model may include a self-attention model configured to determine, for each respective road object of the plurality of road objects, a corresponding plurality of attention scores between (i) the corresponding position-aware embedding vector of the respective road object and (ii) the corresponding position-aware embedding vectors of other road objects of the plurality of road objects. The corresponding tag value of the respective road object may be based on the corresponding plurality of attention scores.

In some embodiments, the plurality of road objects may be represented as nodes of a graph. The relation reasoning ML model may include a graph neural network model configured to determine, for each respective road object of the plurality of road objects, the corresponding tag value based on one or more corresponding position-aware embedding vectors of one or more other road objects of the plurality of road objects. Each of the one or more other road objects may be linked to the respective road object by a corresponding edge of the graph.

In some embodiments, the plurality of road objects may be configured to indicate construction zones. The corresponding road condition may represent a corresponding construction zone in a region of environment indicated by the corresponding locations of the two or more corresponding road objects in the respective group.

In some embodiments, the corresponding location of each respective road object may be determined using a keypoint machine learning model that has been trained by a training process. The training process may include obtaining a training sample that includes (i) a training image representing a plurality of training road objects belonging to the particular class and (ii), for each respective training road object of the plurality of training road objects, a corresponding ground-truth location of the respective training road object within the training image. The training process may also include generating, using the encoder model and based on the training image, a plurality of training feature maps that represent visual features of the training image. The training process may additionally include determining, using the keypoint machine learning model, based on the plurality of training feature maps, and for each respective training road object of the plurality of training road objects, a corresponding training location at which the respective training road object has been detected within the training image. The training process may further include determining a focal loss value by comparing, for each respective training road object of the plurality of training road objects and using a focal loss function, the corresponding ground-truth location of the respective training road object to the corresponding training location of the respective training road object. The training process may yet further include adjusting one or more parameters of the keypoint machine learning model based on the focal loss value.

In some embodiments, the corresponding tag value associated with each respective road object may be determined using a tag machine learning model that has been trained by a training process. The training process may include obtaining a training sample that includes (i) a training image representing a plurality of training road objects belonging to the particular class and (ii) one or more ground-truth groups of the plurality of road objects. The training process may also include generating, using the encoder model and based on the training image, a plurality of training feature maps that represent visual features of the training image. The training process may additionally include determining, using the tag machine learning model, based on the plurality of training feature maps, and for each respective training road object of the plurality of training road objects, a corresponding training tag value associated with the respective training road object, and determining one or more training groups of the plurality of training road objects based on the corresponding training tag value of each respective training road object of the plurality of training road objects. The training process may further include determining a grouping loss value by comparing, using a grouping loss function, the one or more ground-truth groups to the one or more training groups. The grouping loss function may be configured to, for each respective training road object of the plurality of training road objects, cause the corresponding training tag value to (i) converge to first corresponding tag values of a first set of training road objects within a ground-truth group of the respective training road object and (ii) diverge from second corresponding tag values of a second set of training road objects outside of the ground-truth group. The training process may further include adjusting one or more parameters of the tag machine learning model based on the grouping loss value.

In some embodiments, identifying the corresponding road condition may include identifying, for each respective group of the one or more groups and based on (i) the corresponding locations of the two or more corresponding road objects in the respective group and (ii) the particular class of the plurality of road objects, a corresponding environment region in which the corresponding road condition is present. The output may represent the corresponding environment region of each respective group of the one or more groups.

In some embodiments, generating the output may include generating, based on the image, an annotated image that represents the corresponding road condition indicated by each respective group of the one or more groups.

In some embodiments, operation of a vehicle may be controlled based on the output.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining an image representing a plurality of road objects belonging to a particular class;

generating, using an encoder model and based on the image, a plurality of feature maps that represent visual features of the image;

generating, by processing the plurality of feature maps using a keypoint machine learning model, a keypoint map comprising a first plurality of pixels, wherein a corresponding value of each respective pixel of the first plurality of pixels indicates a likelihood that the respective pixel represents a corresponding road object of the plurality of road objects;

determining, based on the keypoint map and for each respective road object of the plurality of road objects, a corresponding location of the respective road object within the image;

generating, by processing the plurality of feature maps using a tag machine learning model, a tag map comprising a second plurality of pixels, wherein each respective pixel of the second plurality of pixels comprises a respective tag value that indicates a group to which an object represented by the respective pixel belongs;

determining, using the tag map and for each respective road object of the plurality of road objects, a corresponding tag value associated with the respective road object based on the corresponding location of the respective road object;

determining one or more groups of the plurality of road objects based on the tag value of each respective road object of the plurality of road objects by grouping road objects based on a similarity of the corresponding tag values of the plurality of road objects, wherein each respective group of the one or more groups comprises two or more corresponding road objects;

identifying, for each respective group of the one or more groups, a corresponding road condition based on (i) the corresponding locations of the two or more corresponding road objects in the respective group and (ii) the particular class of the plurality of road objects; and controlling operation of a vehicle based on the corresponding road condition of at least one group of the one or more groups.

2. The computer-implemented method of claim 1, wherein determining the corresponding location at which each respective road object has been detected within the image comprises:

identifying, within the keypoint map, two or more pixels associated with corresponding values that exceed a threshold value, wherein respective positions of the two or more pixels within the keypoint map represent the corresponding locations of the plurality of road objects.

3. The computer-implemented method of claim 1, wherein the likelihood that the respective pixel represents a corresponding road object indicates a likelihood that the respective pixel represents a predetermined portion of the corresponding road object, and wherein the predetermined portion of the corresponding road object comprises one or more of: (i) a point along a vertical center line of the corresponding road object, (ii) a point along a horizontal center line of the corresponding road object, (iii) a point on a bounding box of the corresponding road object, or (iv) a center point of the bounding box of the corresponding road object.

4. The computer-implemented method of claim 1, wherein determining the corresponding location of the respective road object within the image comprises:

determining, using an offset machine learning model and based on the plurality of feature maps, an offset map comprising a third plurality of pixels, wherein each respective pixel of the third plurality of pixels that represents a corresponding offset between (i) a location within the keypoint map of a corresponding pixel of the first plurality of pixels and (ii) a location within the image of a feature represented by the corresponding pixel of the first plurality of pixels; and determining, for each respective road object of the plurality of road objects, the corresponding location of the respective road object within the image by adding (i) the corresponding offset to (ii) a corresponding location of the respective road object within the keypoint map.

5. The computer-implemented method of claim 1, wherein the respective tag value of each respective pixel of the second plurality of pixels comprises a corresponding tag vector comprising a plurality of values and configured to indicate the group to which the object represented by the respective pixel belongs.

6. The computer-implemented method of claim 5, wherein determining the one or more groups comprises:

determining, for each respective road object of the plurality of road objects, one or more corresponding distance metrics between (i) the corresponding tag vector associated with the respective road object and (ii) one or more tag vectors associated with one or more other road objects of the plurality of road objects; and partitioning the plurality of road objects into the one or more groups based on the one or more corresponding distance metrics of each respective road object of the plurality of road objects.

7. The computer-implemented method of claim 1, wherein the respective tag value of each respective pixel of the second plurality of pixels comprises a corresponding scalar value associated with the respective pixel and configured to indicate the group to which the object represented by the respective pixel belongs.

8. The computer-implemented method of claim 7, wherein determining the one or more groups comprises:

determining, for each respective road object of the plurality of road objects, the corresponding scalar value associated with the respective road object; and partitioning the plurality of road objects into the one or more groups based on the corresponding scalar value of each respective road object of the plurality of road objects.

9. The computer-implemented method of claim 1, wherein the tag machine learning model comprises a semantic embedding model and a relation reasoning machine learning (ML) model, and wherein determining the corresponding tag value comprises:

generating, using the semantic embedding model, based on the plurality of feature maps, and for each respective road object of the plurality of road objects, a corresponding semantic embedding vector;

generating, for each respective road object of the plurality of road objects, a corresponding position-aware semantic embedding vector by combining (i) the corresponding semantic embedding vector of the respective road object with (ii) a positional embedding vector of the respective road object; and generating, using the relation reasoning ML model and for each respective road object of the plurality of road objects, the corresponding tag value based on the corresponding position-aware semantic embedding vector.

10. The computer-implemented method of claim 9, wherein the relation reasoning ML model comprises a self-attention model configured to determine, for each respective road object of the plurality of road objects, a corresponding plurality of attention scores between (i) the corresponding position-aware embedding vector of the respective road object and (ii) the corresponding position-aware embedding vectors of other road objects of the plurality of road objects, wherein the corresponding tag value of the respective road object is based on the corresponding plurality of attention scores.

11. The computer-implemented method of claim 9, wherein the plurality of road objects are represented as nodes of a graph, and wherein the relation reasoning ML model comprises a graph neural network model configured to determine, for each respective road object of the plurality of road objects, the corresponding tag value based on one or more corresponding position-aware embedding vectors of one or more other road objects of the plurality of road objects, wherein each of the one or more other road objects is linked to the respective road object by a corresponding edge of the graph.

12. The computer-implemented method of claim 1, wherein the plurality of road objects are configured to indicate construction zones, wherein the corresponding road condition represents a corresponding construction zone in a region of environment indicated by the corresponding locations of the two or more corresponding road objects in the respective group.

13. The computer-implemented method of claim 1, wherein the keypoint machine learning model has been trained by a training process comprising:

obtaining a training sample comprising (i) a training image representing a plurality of training road objects belonging to the particular class and (ii), for each respective training road object of the plurality of training road objects, a corresponding ground-truth location of the respective training road object within the training image;

generating, using the encoder model and based on the training image, a plurality of training feature maps that represent visual features of the training image;

determining, using the keypoint machine learning model, based on the plurality of training feature maps, and for each respective training road object of the plurality of training road objects, a corresponding training location at which the respective training road object has been detected within the training image;

determining a focal loss value by comparing, for each respective training road object of the plurality of training road objects and using a focal loss function, the corresponding ground-truth location of the respective training road object to the corresponding training location of the respective training road object; and adjusting one or more parameters of the keypoint machine learning model based on the focal loss value.

14. The computer-implemented method of claim 1, wherein the tag machine learning model has been trained by a training process comprising:

obtaining a training sample comprising (i) a training image representing a plurality of training road objects belonging to the particular class and (ii) one or more ground-truth groups of the plurality of road objects;

generating, using the encoder model and based on the training image, a plurality of training feature maps that represent visual features of the training image;

determining, using the tag machine learning model, based on the plurality of training feature maps, and for each respective training road object of the plurality of training road objects, a corresponding training tag value associated with the respective training road object;

determining one or more training groups of the plurality of training road objects based on the corresponding training tag value of each respective training road object of the plurality of training road objects;

determining a grouping loss value by comparing, using a grouping loss function, the one or more ground-truth groups to the one or more training groups, wherein the grouping loss function is configured to, for each respective training road object of the plurality of training road objects, cause the corresponding training tag value to (i) converge to first corresponding tag values of a first set of training road objects within a ground-truth group of the respective training road object and (ii) diverge from second corresponding tag values of a second set of training road objects outside of the ground-truth group; and adjusting one or more parameters of the tag machine learning model based on the grouping loss value.

15. The computer-implemented method of claim 1, wherein identifying the corresponding road condition comprises:

identifying, for each respective group of the one or more groups and based on (i) the corresponding locations of the two or more corresponding road objects in the respective group and (ii) the particular class of the plurality of road objects, a corresponding environment region in which the corresponding road condition is present, wherein the operation of the vehicle is controlled based on the corresponding environment region of the at least one group of the one or more groups.

16. The computer-implemented method of claim 1, further comprising:

generating, based on the image, an annotated image that represents the corresponding road condition indicated by each respective group of the one or more groups.

17. A system comprising:

a camera;

a processor; and a non-transitory computer-readable medium having stored thereon instructions that, when executed by the processor, cause the processor to perform operations comprising:

obtaining, from the camera, an image representing a plurality of road objects belonging to a particular class;

generating, using an encoder model and based on the image, a plurality of feature maps that represent visual features of the image;

generating, by processing the plurality of feature maps using a keypoint machine learning model, a keypoint map comprising a first plurality of pixels, wherein a corresponding value of each respective pixel of the first plurality of pixels indicates a likelihood that the respective pixel represents a corresponding road object of the plurality of road objects;

determining, based on the keypoint map and for each respective road object of the plurality of road objects, a corresponding location of the respective road object within the image;

generating, by processing the plurality of feature maps using a tag machine learning model, a tag map comprising a second plurality of pixels, wherein each respective pixel of the second plurality of pixels comprises a respective tag value that indicates a group to which an object represented by the respective pixel belongs;

determining, using the tag map and for each respective road object of the plurality of road objects, a corresponding tag value associated with the respective road object based on the corresponding location of the respective road object;

determining one or more groups of the plurality of road objects based on the tag value of each respective road object of the plurality of road objects by grouping road objects based on a similarity of the corresponding tag values of the plurality of road objects, wherein each respective group of the one or more groups comprises two or more corresponding road objects;

identifying, for each respective group of the one or more groups, a corresponding road condition based on (i) the corresponding locations of the two or more corresponding road objects in the respective group and (ii) the particular class of the plurality of road objects; and controlling operation of a vehicle based on the corresponding road condition of at least one group of the one or more groups.

18. The system of claim 17, wherein the tag machine learning model comprises a semantic embedding model and a relation reasoning machine learning (ML) model, and wherein determining the corresponding tag value comprises:

generating, using the semantic embedding model, based on the plurality of feature maps, and for each respective road object of the plurality of road objects, a corresponding semantic embedding vector;

generating, for each respective road object of the plurality of road objects, a corresponding position-aware semantic embedding vector by combining (i) the corresponding semantic embedding vector of the respective road object with (ii) a positional embedding vector of the respective road object; and generating, using the relation reasoning ML model and for each respective road object of the plurality of road objects, the corresponding tag value based on the corresponding position-aware semantic embedding vector.

19. A non-transitory computer-readable medium having stored thereon instructions that, when executed by a computing device, cause the computing device to perform operations comprising:

obtaining an image representing a plurality of road objects belonging to a particular class;

generating, using an encoder model and based on the image, a plurality of feature maps that represent visual features of the image;

generating, by processing the plurality of feature maps using a keypoint machine learning model, a keypoint map comprising a first plurality of pixels, wherein a corresponding value of each respective pixel of the first plurality of pixels indicates a likelihood that the respective pixel represents a corresponding road object of the plurality of road objects;

determining, based on the keypoint map and for each respective road object of the plurality of road objects, a corresponding location of the respective road object within the image;

generating, by processing the plurality of features maps using a tag machine learning model, a tag map comprising a second plurality of pixels, wherein each respective pixel of the second plurality of pixels comprises a respective tag value that indicates a group to which an object represented by the respective pixel belongs;

determining, using the tag map and for each respective road object of the plurality of road objects, a corresponding tag value associated with the respective road object based on the corresponding location of the respective road object;

determining one or more groups of the plurality of road objects based on the tag value of each respective road object of the plurality of road objects by grouping road objects based on a similarity of the corresponding tag values of the plurality of road objects, wherein each respective group of the one or more groups comprises two or more corresponding road objects;

identifying, for each respective group of the one or more groups, a corresponding road condition based on (i) the corresponding locations of the two or more corresponding road objects in the respective group and (ii) the particular class of the plurality of road objects; and controlling operation of a vehicle based on the corresponding road condition of at least one group of the one or more groups.

20. The computer-implemented method of claim 1, wherein the keypoint map and the tag map are generated non-serially such that generation of the keypoint map is independent of generation of the tag map and generation of the tag map is independent of generation of the keypoint map.

* * * * *